US007526736B2

(12) United States Patent
Kaminkow et al.

(10) Patent No.: US 7,526,736 B2
(45) **Date of Patent: *Apr. 28, 2009**

(54) GAMING DEVICE HAVING TOUCH ACTIVATED ALTERNATING OR CHANGING SYMBOL

(75) Inventors: Joseph E. Kaminkow, Reno, NV (US); Aaron T. Jones, Reno, NV (US)

(73) Assignee: IGT, Reno, NV (US)

( * ) Notice: Subject to any disclaimer, the term of this patent is extended or adjusted under 35 U.S.C. 154(b) by 554 days.

This patent is subject to a terminal disclaimer.

(21) Appl. No.: 10/826,465

(22) Filed: Apr. 16, 2004

(65) Prior Publication Data

US 2004/0198489 A1 Oct. 7, 2004

Related U.S. Application Data

(63) Continuation of application No. 09/602,331, filed on Jun. 23, 2000, now Pat. No. 6,731,313.

(51) Int. Cl.
*G06F 17/00* (2006.01)
*A63F 13/00* (2006.01)

(52) U.S. Cl. .................................... 715/839; 715/970.1

(58) Field of Classification Search ................. 715/970, 715/970.1, 839, 831, 747, 746, 821–823, 715/830, 829; 463/20–22, 25, 16, 10–13, 463/1, 45–47, 29, 30, 40–43; 273/138.1, 273/142, 143, 139; 700/90, 91

See application file for complete search history.

(56) References Cited

U.S. PATENT DOCUMENTS 3,831,172 A 8/1974 Olliges et al.
4,300,225 A 11/1981 Lambl (Continued)

FOREIGN PATENT DOCUMENTS

EP 0843272 5/1998

(Continued)

OTHER PUBLICATIONS

Game King Series Advertisement, written by IGT, published in 1997.

(Continued)

*Primary Examiner*—Steven P Sax
(74) *Attorney, Agent, or Firm*—Bell, Boyd & Lloyd LLP

(57) ABSTRACT

A gaming device that enables a player to choose or alter certain symbols displayed on the reels of the gaming device. The player can change or select the changeable symbol at any time as long as the reels are not in motion. The gaming device maintains the change until the player changes the symbol again. The gaming device preferably supplies a touch screen along with a video monitor in which the reels and associated stops are simulated. The touch screen enables the player to simply touch the symbol that the player wishes to change. Pressing a single symbol may change the selected symbol or others linked to the symbol. A stop on the reels having a selectable symbol can provide the player with any number of possible symbols from which to choose. The changeable symbols preferably have a direct effect upon whether the player obtains a gaming device award.

140 Claims, 7 Drawing Sheets

U.S. PATENT DOCUMENTS 4,314,236 A 2/1982 Mayer et al.
4,335,809 A 6/1982 Wain
4,339,798 A 7/1982 Hedges et al.
4,344,345 A 8/1982 Sano
4,363,482 A 12/1982 Goldfarb
RE31,441 E 11/1983 Nutting et al.
4,496,149 A 1/1985 Schwartzberg
4,572,509 A 2/1986 Sitrick
4,582,324 A 4/1986 Koza et al.
4,618,150 A 10/1986 Kimura
4,624,459 A 11/1986 Kaufman
4,652,998 A 3/1987 Koza et al.
4,660,107 A 4/1987 Chippendale, Jr.
4,695,053 A 9/1987 Vazquez, Jr. et al.
4,712,189 A 12/1987 Mohri
4,732,386 A 3/1988 Rayfiel
4,733,593 A 3/1988 Rothbart
4,791,558 A 12/1988 Chaitin et al.
4,842,278 A 6/1989 Markowicz
4,856,787 A 8/1989 Itkis
4,866,515 A 9/1989 Tagawa et al.
4,876,937 A 10/1989 Suzuki
4,924,378 A 5/1990 Hershey et al.
4,961,575 A 10/1990 Perry
4,974,483 A 12/1990 Luzzatto
4,974,857 A 12/1990 Beall et al.
5,046,735 A 9/1991 Hamano et al.
5,096,195 A 3/1992 Gimmon
5,119,465 A 6/1992 Jack
5,123,649 A 6/1992 Tiberio
5,138,712 A 8/1992 Corbin
5,142,622 A 8/1992 Owens
5,179,517 A 1/1993 Sarbin et al.
5,221,801 A 6/1993 Bruti et al.
5,223,828 A 6/1993 McKiel, Jr.
5,242,163 A 9/1993 Fulton
5,258,574 A 11/1993 Kawano
5,266,736 A 11/1993 Saito
5,275,400 A 1/1994 Weingardt et al.
5,276,312 A 1/1994 McCarthy
5,287,102 A 2/1994 McKiel, Jr.
5,288,978 A 2/1994 Iijima
5,305,195 A 4/1994 Murphy
5,331,112 A 7/1994 Sato et al.
5,342,047 A 8/1994 Heidel et al.
5,344,144 A 9/1994 Canon
5,349,642 A 9/1994 Kingdon
5,371,345 A 12/1994 LeStrange et al.
5,375,206 A 12/1994 Hunter et al.
5,377,993 A 1/1995 Josephs
5,390,938 A 2/1995 Takeya
5,393,061 A 2/1995 Manship et al.
5,393,070 A 2/1995 Best
5,404,567 A 4/1995 DePietro et al.
5,429,361 A 7/1995 Raven et al.
5,429,507 A 7/1995 Kaplan
5,429,513 A 7/1995 Diaz-Plaza
5,430,791 A 7/1995 Feit et al.
5,430,835 A 7/1995 Williams et al.
5,438,508 A 8/1995 Wyman
5,446,902 A 8/1995 Islam
5,449,173 A 9/1995 Thomas et al.
5,465,082 A 11/1995 Weingardt
5,469,511 A 11/1995 Lewis et al.
5,470,233 A 11/1995 Fruchterman et al.
5,472,197 A 12/1995 Gwiasda et al.
5,499,340 A 3/1996 Barritz
5,507,491 A 4/1996 Gatto et al.
5,508,699 A 4/1996 Silverman
5,511,781 A 4/1996 Wood et al.
5,515,764 A 5/1996 Rosen
5,530,232 A 6/1996 Taylor
5,559,313 A 9/1996 Claus et al.
5,560,603 A 10/1996 Seelig et al.
5,564,700 A 10/1996 Celona
5,566,337 A 10/1996 Szymanski et al.
5,577,253 A 11/1996 Blickstein
5,578,808 A 11/1996 Taylor
5,586,257 A 12/1996 Perlman
5,586,937 A 12/1996 Menashe
5,606,144 A 2/1997 Dabby
5,611,535 A 3/1997 Tiberio
5,617,331 A 4/1997 Wakai et al.
5,625,845 A 4/1997 Allran
5,626,341 A 5/1997 Jones et al.
5,630,754 A 5/1997 Rebane
5,630,757 A 5/1997 Gagin et al.
5,640,192 A 6/1997 Garfinkle
5,643,086 A 7/1997 Alcorn et al.
5,649,118 A 7/1997 Carlisle et al.
5,655,603 A 8/1997 Schulte et al.
5,655,961 A 8/1997 Acres et al.
5,664,998 A 9/1997 Seelig et al.
5,668,996 A 9/1997 Radinsky
5,671,412 A 9/1997 Christiano
5,695,188 A 12/1997 Ishibashi
5,697,843 A 12/1997 Manship et al.
5,702,304 A 12/1997 Acres et al.
5,703,310 A 12/1997 Kurakake et al.
5,707,286 A 1/1998 Carlson
5,708,709 A 1/1998 Rose
5,715,459 A 2/1998 Celi
5,717,604 A 2/1998 Wiggins
5,741,183 A 4/1998 Acres et al.
5,745,761 A 4/1998 Celi
5,745,762 A 4/1998 Celi
5,745,879 A 4/1998 Wyman
5,752,882 A 5/1998 Acres et al.
5,755,621 A 5/1998 Marks et al.
5,758,069 A 5/1998 Olsen
5,758,875 A 6/1998 Giacalone, Jr.
5,759,102 A 6/1998 Pease et al.
5,762,552 A 6/1998 Vuong et al.
5,766,074 A 6/1998 Cannon et al.
5,766,076 A 6/1998 Pease et al.
5,768,382 A 6/1998 Schneier et al.
5,769,716 A 6/1998 Saffari et al.
5,772,509 A 6/1998 Weiss
5,778,231 A 7/1998 Van Hoff
5,779,545 A 7/1998 Berg et al.
5,779,549 A 7/1998 Walker et al.
5,792,972 A 8/1998 Houston
5,800,268 A 9/1998 Molnick
5,802,364 A 9/1998 Senator
5,806,855 A 9/1998 Cherry
5,807,172 A 9/1998 Piechowiak
5,809,303 A 9/1998 Senator
5,812,688 A 9/1998 Gibson
5,820,459 A 10/1998 Acres et al.
5,823,873 A 10/1998 Moody
5,828,840 A 10/1998 Cowan et al.
5,833,538 A 11/1998 Weiss
5,833,540 A 11/1998 Miodunski et al.
5,836,817 A 11/1998 Acres et al.
5,839,958 A 11/1998 Ozarow
5,845,283 A 12/1998 Williams et al.
5,848,932 A 12/1998 Adams
5,851,011 A 12/1998 Loff
5,851,147 A * 12/1998 Stupak et al. ................. 463/13
5,851,149 A 12/1998 Xidos et al.
5,854,927 A 12/1998 Gelissen
5,855,515 A 1/1999 Pease et al.
5,871,398 A 2/1999 Schneier et al.
5,876,284 A 3/1999 Acres et al.

| | | | | |
|---|---|---|---|---|
| 5,880,386 | A | | 3/1999 | Wachi et al. |
| 5,885,158 | A | | 3/1999 | Torango et al. |
| 5,889,990 | A | | 3/1999 | Coleman |
| 5,892,171 | A | | 4/1999 | Ide |
| 5,902,184 | A | | 5/1999 | Bennett et al. |
| 5,903,732 | A | | 5/1999 | Reed et al. |
| 5,905,248 | A | | 5/1999 | Russell et al. |
| 5,908,354 | A | | 6/1999 | Okuniewicz |
| 5,910,048 | A | | 6/1999 | Feinberg |
| 5,911,071 | A | | 6/1999 | Jordan |
| 5,913,164 | A | | 6/1999 | Pawa et al. |
| 5,917,725 | A | | 6/1999 | Thacher et al. |
| 5,918,039 | A | | 6/1999 | Buswell et al. |
| 5,920,720 | A | | 7/1999 | Toutonghi |
| 5,920,842 | A | | 7/1999 | Cooper et al. |
| 5,923,878 | A | | 7/1999 | Marsland |
| 5,923,880 | A | | 7/1999 | Rose |
| 5,925,127 | A | | 7/1999 | Ahmad |
| 5,930,509 | A | | 7/1999 | Yates |
| 5,937,193 | A | | 8/1999 | Evoy |
| 5,941,773 | A | | 8/1999 | Harlick |
| 5,946,487 | A | | 8/1999 | Dangelo |
| 5,946,489 | A | | 8/1999 | Yellin |
| 5,947,822 | A | | 9/1999 | Weiss |
| 5,951,397 | A | | 9/1999 | Dickinson |
| 5,951,611 | A | | 9/1999 | La Pierre |
| 5,964,843 | A | | 10/1999 | Eisler |
| 5,966,535 | A | | 10/1999 | Benedikt |
| 5,967,894 | A | | 10/1999 | Kinoshita et al. |
| 5,970,143 | A | | 10/1999 | Schneier et al. |
| 5,970,249 | A | | 10/1999 | Holze |
| 5,971,271 | A | | 10/1999 | Wynn et al. |
| 5,971,849 | A | | 10/1999 | Falciglia |
| 5,974,409 | A | | 10/1999 | Sanu et al. |
| 5,978,585 | A | | 11/1999 | Crelier |
| 5,980,093 | A | | 11/1999 | Jones et al. |
| 5,980,384 | A | * | 11/1999 | Barrie ......................... 463/16 |
| 5,983,190 | A | | 11/1999 | Trower, II et al. |
| 5,991,760 | A | | 11/1999 | Gauvin et al. |
| 5,991,790 | A | | 11/1999 | Shah et al. |
| 5,996,068 | A | | 11/1999 | Dwyer, III et al. |
| 5,997,401 | A | | 12/1999 | Crawford |
| 5,999,731 | A | | 12/1999 | Yellin |
| 5,999,808 | A | | 12/1999 | La Due |
| 6,001,016 | A | | 12/1999 | Walker et al. |
| 6,003,038 | A | | 12/1999 | Chen |
| 6,003,066 | A | | 12/1999 | Ryan et al. |
| 6,003,094 | A | | 12/1999 | Dean |
| 6,003,123 | A | | 12/1999 | Carter et al. |
| 6,011,850 | A | | 1/2000 | Bertrand et al. |
| 6,015,346 | A | | 1/2000 | Bennett |
| D421,277 | S | | 2/2000 | McGahn et al. |
| 6,021,272 | A | | 2/2000 | Cahill |
| 6,021,273 | A | | 2/2000 | Criesemer |
| 6,024,640 | A | | 2/2000 | Walker et al. |
| 6,026,238 | A | | 2/2000 | Bond |
| 6,027,115 | A | | 2/2000 | Griswold et al. |
| 6,029,000 | A | | 2/2000 | Woosley |
| 6,031,993 | A | | 2/2000 | Andrews |
| 6,035,120 | A | | 3/2000 | Ravichandran |
| 6,052,527 | A | | 4/2000 | Delcourt et al. |
| 6,056,642 | A | | 5/2000 | Bennett |
| 6,062,979 | A | | 5/2000 | Inoue |
| 6,066,181 | A | | 5/2000 | DeMaster |
| 6,068,552 | A | | 5/2000 | Walker et al. |
| 6,068,982 | A | | 5/2000 | Rolfe et al. |
| 6,071,190 | A | | 6/2000 | Weiss et al. |
| 6,071,192 | A | | 6/2000 | Weiss |
| 6,074,432 | A | | 6/2000 | Guccione |
| 6,075,940 | A | | 6/2000 | Gosling |
| 6,079,985 | A | | 6/2000 | Wohl et al. |
| 6,084,169 | A | | 7/2000 | Hasegawa et al. |
| 6,085,247 | A | | 7/2000 | Parsons, Jr. et al. |
| 6,089,975 | A | | 7/2000 | Dunn |
| 6,089,976 | A | | 7/2000 | Schneider et al. |
| 6,089,978 | A | | 7/2000 | Adams |
| 6,089,982 | A | | 7/2000 | Holch et al. |
| 6,092,147 | A | | 7/2000 | Levy |
| 6,096,095 | A | | 8/2000 | Halstead |
| 6,099,408 | A | | 8/2000 | Schneier et al. |
| 6,102,400 | A | | 8/2000 | Scott et al. |
| 6,103,964 | A | | 8/2000 | Kay |
| 6,106,393 | A | | 8/2000 | Sunaga et al. |
| 6,106,396 | A | | 8/2000 | Alcorn et al. |
| 6,108,420 | A | | 8/2000 | Larose et al. |
| 6,110,041 | A | | 8/2000 | Walker et al. |
| 6,110,043 | A | | 8/2000 | Olsen |
| 6,110,226 | A | | 8/2000 | Bothner |
| 6,113,098 | A | | 9/2000 | Adams |
| 6,113,495 | A | | 9/2000 | Walker |
| 6,117,009 | A | | 9/2000 | Yoseloff |
| 6,117,013 | A | | 9/2000 | Eiba |
| 6,126,165 | A | | 10/2000 | Sakamoto |
| 6,131,191 | A | | 10/2000 | Cierniak |
| 6,135,884 | A | | 10/2000 | Hendrick et al. |
| 6,135,887 | A | | 10/2000 | Pease et al. |
| 6,138,273 | A | | 10/2000 | Sturges |
| 6,141,737 | A | | 10/2000 | Krantz et al. |
| 6,141,794 | A | | 10/2000 | Dice |
| 6,142,872 | A | | 11/2000 | Walker et al. |
| 6,142,875 | A | | 11/2000 | Kodachi et al. |
| 6,146,272 | A | | 11/2000 | Walker et al. |
| 6,146,273 | A | | 11/2000 | Olsen |
| 6,146,276 | A | | 11/2000 | Okuniewicz |
| 6,149,522 | A | | 11/2000 | Alcorn et al. |
| 6,151,707 | A | | 11/2000 | Hecksel et al. |
| 6,155,925 | A | | 12/2000 | Giobbi et al. |
| 6,159,096 | A | * | 12/2000 | Yoseloff ...................... 463/20 |
| 6,159,097 | A | | 12/2000 | Gura |
| 6,162,122 | A | | 12/2000 | Acres et al. |
| 6,168,519 | B1 | | 1/2001 | Nakagawa et al. |
| 6,174,233 | B1 | | 1/2001 | Sunaga et al. |
| 6,174,235 | B1 | | 1/2001 | Walker et al. |
| 6,175,632 | B1 | | 1/2001 | Marx |
| 6,186,894 | B1 | | 2/2001 | Mayeroff |
| 6,190,255 | B1 | | 2/2001 | Thomas et al. |
| 6,198,395 | B1 | | 3/2001 | Sussman |
| 6,206,782 | B1 | | 3/2001 | Walker et al. |
| 6,217,448 | B1 | | 4/2001 | Olsen |
| 6,219,836 | B1 | | 4/2001 | Wells et al. |
| 6,224,482 | B1 | | 5/2001 | Bennet |
| 6,224,486 | B1 | | 5/2001 | Walker et al. |
| 6,227,971 | B1 | * | 5/2001 | Weiss .......................... 463/20 |
| 6,233,731 | B1 | | 5/2001 | Bond et al. |
| 6,238,288 | B1 | | 5/2001 | Walker et al. |
| 6,241,608 | B1 | | 6/2001 | Torango |
| 6,241,612 | B1 | | 6/2001 | Heredia |
| 6,251,014 | B1 | | 6/2001 | Stockdale et al. |
| 6,254,481 | B1 | | 7/2001 | Jaffe |
| 6,254,483 | B1 | | 7/2001 | Acres |
| 6,257,981 | B1 | | 7/2001 | Acres et al. |
| 6,264,556 | B1 | * | 7/2001 | Izawa et al. ................... 463/25 |
| 6,264,561 | B1 | | 7/2001 | Saffari et al. |
| 6,270,411 | B1 | | 8/2001 | Gura et al. |
| 6,287,197 | B1 | | 9/2001 | Dickinson et al. |
| 6,287,200 | B1 | | 9/2001 | Sharma |
| 6,287,202 | B1 | | 9/2001 | Pascal et al. |
| 6,290,600 | B1 | * | 9/2001 | Glasson ....................... 463/20 |
| 6,293,866 | B1 | | 9/2001 | Walker et al. |
| 6,293,869 | B1 | | 9/2001 | Kwan et al. |
| 6,295,638 | B1 | | 9/2001 | Brown et al. |
| 6,302,790 | B1 | * | 10/2001 | Brossard ...................... 463/20 |
| 6,302,791 | B1 | | 10/2001 | Frohm et al. |
| 6,304,905 | B1 | | 10/2001 | Clark |
| 6,306,034 | B1 | | 10/2001 | Sakamoto et al. |
| 6,308,271 | B2 | | 10/2001 | Tanaka |

6,309,299 B1 10/2001 Weiss
6,309,301 B1 10/2001 Sano
6,311,982 B1 11/2001 Lebensfeld et al.
6,312,332 B1 11/2001 Walker et al.
6,312,333 B1 11/2001 Acres
6,319,122 B1 11/2001 Packes, Jr. et al.
6,319,125 B1 11/2001 Acres
6,321,323 B1 11/2001 Nugroho et al.
6,325,716 B1 12/2001 Walker et al.
6,328,648 B1 12/2001 Walker et al.
6,345,386 B1 2/2002 Delo et al.
6,353,928 B1 3/2002 Altberg et al.
6,354,946 B1 3/2002 Finn
6,358,147 B1 3/2002 Jaffe et al.
6,358,150 B1 3/2002 Mir et al.
6,361,437 B1 3/2002 Walker et al.
6,361,441 B1 3/2002 Walker et al.
6,364,314 B1 4/2002 Canterbury
6,364,768 B1 4/2002 Acres et al.
6,368,216 B1 4/2002 Hedrick et al.
6,375,567 B1 4/2002 Acres
6,375,568 B1 * 4/2002 Roffman et al. ............... 463/26
6,375,569 B1 4/2002 Acres
6,383,074 B1 5/2002 Boggs
6,389,538 B1 5/2002 Gruse et al.
6,389,589 B1 5/2002 Mishra et al.
6,390,923 B1 5/2002 Yoshitomi et al.
6,394,900 B1 * 5/2002 McGlone et al. .............. 463/20
6,394,907 B1 5/2002 Rowe
6,397,381 B1 5/2002 Delo et al.
6,402,614 B1 6/2002 Schneier et al.
6,409,596 B1 6/2002 Hayashida et al.
6,409,602 B1 6/2002 Wiltshire et al.
6,416,411 B1 7/2002 Tsukahara
6,418,554 B1 7/2002 Delo et al.
6,425,828 B2 7/2002 Walker et al.
6,427,227 B1 7/2002 Chamberlain
6,439,996 B2 8/2002 LeMay et al.
6,442,529 B1 8/2002 Krishan et al.
6,443,839 B2 9/2002 Stockdale et al.
6,450,887 B1 9/2002 Mir et al.
6,454,649 B1 9/2002 Mattice et al.
6,457,175 B1 9/2002 Lerche
RE37,885 E 10/2002 Acres et al.
6,488,585 B1 12/2002 Wells et al.
6,491,584 B2 12/2002 Graham et al.
6,503,146 B2 1/2003 Walker et al.
6,503,147 B1 1/2003 Baerlocher et al.
6,504,089 B1 1/2003 Negishi et al.
6,508,710 B1 1/2003 Paravia et al.
6,516,466 B1 2/2003 Jackson
6,520,856 B1 2/2003 Walker et al.
6,523,166 B1 2/2003 Mishra et al.
6,527,638 B1 3/2003 Walker et al.
6,532,543 B1 3/2003 Smith et al.
6,533,658 B1 * 3/2003 Walker et al. ................. 463/13
6,533,664 B1 3/2003 Crumby
6,537,152 B2 3/2003 Seelig et al.
6,544,122 B2 4/2003 Araki et al.
6,554,703 B1 4/2003 Bussick et al.
6,561,903 B2 * 5/2003 Walker et al. ................. 463/25
6,561,908 B1 5/2003 Hoke
6,565,433 B1 5/2003 Baerlocher et al.
6,565,434 B1 5/2003 Acres
6,565,436 B1 5/2003 Baerlocher
6,575,832 B1 6/2003 Manfredi et al.
6,578,199 B1 6/2003 Tsou et al.
6,592,457 B1 7/2003 Frohm et al.
6,595,856 B1 7/2003 Ginsburg et al.
6,599,195 B1 7/2003 Araki et al.
6,604,740 B1 8/2003 Singer et al.
6,607,439 B2 8/2003 Schneier et al.
6,609,972 B2 8/2003 Seelig et al.
6,609,978 B1 8/2003 Paulsen
6,612,574 B1 * 9/2003 Cole et al. ............... 273/138.1
6,620,047 B1 9/2003 Alcorn et al.
6,628,939 B2 9/2003 Paulsen
6,638,169 B2 10/2003 Wilder et al.
6,638,170 B1 10/2003 Crumby
6,645,077 B2 11/2003 Rowe
6,656,046 B1 12/2003 Yoseloff et al.
6,682,073 B2 1/2004 Bryant et al.
6,682,423 B2 1/2004 Brosnan et al.
6,685,567 B2 2/2004 Cockerille et al.
6,688,976 B1 2/2004 Tulley et al.
6,692,353 B2 2/2004 Walker et al.
6,712,699 B2 3/2004 Walker et al.
6,712,702 B2 3/2004 Goldberg et al.
6,722,986 B1 4/2004 Lyons et al.
6,729,618 B1 5/2004 Koenig et al.
6,731,313 B1 * 5/2004 Kaminkow ................ 715/839
6,733,390 B2 5/2004 Walker et al.
6,739,973 B1 5/2004 Lucchesi et al.
6,746,327 B2 6/2004 Frohm et al.
6,749,510 B2 6/2004 Giobbi
6,755,738 B2 6/2004 Glasson et al.
6,769,985 B1 8/2004 Laakso et al.
6,782,477 B2 8/2004 McCarroll
6,790,142 B2 9/2004 Okada et al.
6,790,143 B2 9/2004 Crumby
6,802,778 B1 10/2004 LeMay et al.
6,804,763 B1 10/2004 Stockdale et al.
6,805,634 B1 10/2004 Wells et al.
6,810,517 B2 10/2004 Bond et al.
6,811,488 B2 11/2004 Paravia et al.
6,813,765 B1 11/2004 Flores
6,816,882 B1 11/2004 Conner et al.
6,823,456 B1 11/2004 Dan et al.
6,830,515 B2 12/2004 Rowe
6,832,958 B2 12/2004 Acres et al.
6,834,245 B2 12/2004 Ota et al.
6,835,132 B2 12/2004 Bennett
6,835,134 B2 12/2004 Poole et al.
6,836,794 B1 12/2004 Lucovsky et al.
6,837,790 B1 1/2005 Kaminkow
6,843,723 B2 1/2005 Joshi
6,843,725 B2 1/2005 Nelson
6,846,238 B2 1/2005 Wells
6,848,996 B2 2/2005 Hecht et al.
6,852,031 B1 2/2005 Rowe
6,855,054 B2 2/2005 White et al.
6,855,057 B2 2/2005 Namba et al.
6,857,959 B1 2/2005 Nguyen
6,863,608 B1 3/2005 LeMay et al.
6,866,581 B2 3/2005 Martinek et al.
6,866,584 B2 3/2005 Michaelson
6,866,586 B2 3/2005 Oberberger et al.
6,875,109 B2 4/2005 Stockdale
6,875,110 B1 4/2005 Crumby
6,878,063 B2 4/2005 Manfredi et al.
6,884,162 B2 4/2005 Raverdy et al.
6,884,166 B2 4/2005 Leen et al.
6,884,170 B2 4/2005 Rowe
6,884,171 B2 4/2005 Eck et al.
6,884,173 B2 4/2005 Gauselmann
6,884,174 B2 4/2005 Lundy et al.
6,887,151 B2 5/2005 Leen et al.
6,887,156 B2 5/2005 DeWeese et al.
6,889,159 B2 5/2005 Klotz et al.
6,890,256 B2 5/2005 Walker et al.
6,896,616 B2 5/2005 Weiss
6,896,618 B2 5/2005 Benoy et al.
6,899,627 B2 5/2005 Lam et al.
6,899,628 B2 5/2005 Leen et al.
6,901,375 B2 5/2005 Fernandez
6,902,481 B2 6/2005 Breckner et al.

| | | | |
|---|---|---|---|
| 6,908,391 | B2 | 6/2005 | Gatto et al. |
| 6,910,965 | B2 | 6/2005 | Downes |
| 6,918,832 | B2 | 7/2005 | Baerlocher et al. |
| 6,935,955 | B1 | 8/2005 | Kaminkow et al. |
| 6,939,223 | B1 | 9/2005 | Jones |
| 6,939,226 | B1 | 9/2005 | Joshl |
| 6,939,234 | B2 | 9/2005 | Beatty |
| 6,942,571 | B1 | 9/2005 | McAllister et al. |
| 6,942,574 | B1 | 9/2005 | LeMay |
| 6,945,870 | B2 | 9/2005 | Gatto et al. |
| 6,960,136 | B2 | 11/2005 | Joshi et al. |
| 6,974,385 | B2 | 12/2005 | Joshi et al. |
| 6,981,635 | B1 | 1/2006 | Hughs-Baird et al. |
| 6,991,543 | B2 | 1/2006 | Joshi |
| 6,991,544 | B2 | 1/2006 | Soltys et al. |
| 7,001,274 | B2 | 2/2006 | Baerlocher et al. |
| 7,014,559 | B1 * | 3/2006 | Fong .......................... 463/20 |
| 7,051,004 | B2 | 5/2006 | Nuttal et al. |
| 7,063,617 | B2 | 6/2006 | Brosnan et al. |
| 7,066,814 | B2 | 6/2006 | Glavich et al. |
| 7,070,501 | B2 | 7/2006 | Cormack et al. |
| 7,094,149 | B2 | 8/2006 | Walker et al. |
| 7,105,736 | B2 | 9/2006 | Laakso |
| 2001/0024971 | A1 | 9/2001 | Brossard |
| 2001/0029542 | A1 | 10/2001 | Nishimura |
| 2001/0036857 | A1 | 11/2001 | Mothwurf et al. |
| 2001/0044337 | A1 | 11/2001 | Rowe et al. |
| 2001/0046893 | A1 | 11/2001 | Giobbi et al. |
| 2001/0053712 | A1 * | 12/2001 | Yoseloff et al. ............... 463/1 |
| 2001/0055990 | A1 | 12/2001 | Acres |
| 2002/0013173 | A1 | 1/2002 | Walker et al. |
| 2002/0025844 | A1 | 2/2002 | Casey et al. |
| 2002/0032049 | A1 | 3/2002 | Walker et al. |
| 2002/0039919 | A1 | 4/2002 | Joshi et al. |
| 2002/0045484 | A1 | 4/2002 | Eck et al. |
| 2002/0057800 | A1 | 5/2002 | Gordon et al. |
| 2002/0058546 | A2 | 5/2002 | Acres |
| 2002/0068629 | A1 | 6/2002 | Allen et al. |
| 2002/0068631 | A1 | 6/2002 | Raverdy et al. |
| 2002/0071557 | A1 | 6/2002 | Nguyen |
| 2002/0071560 | A1 | 6/2002 | Kurn et al. |
| 2002/0077165 | A1 | 6/2002 | Bansemer et al. |
| 2002/0080969 | A1 | 6/2002 | Giobbi |
| 2002/0090990 | A1 | 7/2002 | Joshi et al. |
| 2002/0098883 | A1 | 7/2002 | Packes et al. |
| 2002/0107067 | A1 * | 8/2002 | McGlone et al. ............. 463/20 |
| 2002/0109718 | A1 | 8/2002 | Mansour et al. |
| 2002/0116615 | A1 | 8/2002 | Nguyen et al. |
| 2002/0138594 | A1 | 9/2002 | Rowe |
| 2002/0144116 | A1 | 10/2002 | Giobbi |
| 2002/0151349 | A1 | 10/2002 | Joshi |
| 2002/0151360 | A1 | 10/2002 | Durham et al. |
| 2002/0160826 | A1 | 10/2002 | Gomez et al. |
| 2002/0169022 | A1 | 11/2002 | Canterbury |
| 2002/0173355 | A1 | 11/2002 | Walker et al. |
| 2002/0174160 | A1 | 11/2002 | Gatto et al. |
| 2002/0174444 | A1 | 11/2002 | Gatto et al. |
| 2002/0177483 | A1 | 11/2002 | Cannon |
| 2002/0188940 | A1 | 12/2002 | Breckner et al. |
| 2002/0198044 | A1 | 12/2002 | Walker et al. |
| 2003/0003988 | A1 | 1/2003 | Walker et al. |
| 2003/0027619 | A1 | 2/2003 | Nicastro |
| 2003/0027635 | A1 | 2/2003 | Walker et al. |
| 2003/0027638 | A1 | 2/2003 | Schneider et al. |
| 2003/0045351 | A1 | 3/2003 | Gauselmann |
| 2003/0045354 | A1 | 3/2003 | Giobbi |
| 2003/0054879 | A1 | 3/2003 | Schneier et al. |
| 2003/0060286 | A1 | 3/2003 | Walker et al. |
| 2003/0064771 | A1 | 4/2003 | Morrow et al. |
| 2003/0064798 | A1 | 4/2003 | Grauzer et al. |
| 2003/0064801 | A1 | 4/2003 | Breckner et al. |
| 2003/0064807 | A1 | 4/2003 | Walker et al. |
| 2003/0064808 | A1 | 4/2003 | Hecht et al. |
| 2003/0069058 | A1 | 4/2003 | Byrne et al. |
| 2003/0073489 | A1 | 4/2003 | Hecht et al. |
| 2003/0073490 | A1 | 4/2003 | Hecht et al. |
| 2003/0073491 | A1 | 4/2003 | Hecht et al. |
| 2003/0073497 | A1 | 4/2003 | Nelson |
| 2003/0078094 | A1 | 4/2003 | Gatto et al. |
| 2003/0078101 | A1 | 4/2003 | Schneider et al. |
| 2003/0078103 | A1 | 4/2003 | LeMay et al. |
| 2003/0092489 | A1 | 5/2003 | Veradej |
| 2003/0093669 | A1 | 5/2003 | Morais et al. |
| 2003/0100359 | A1 | 5/2003 | Loose et al. |
| 2003/0100369 | A1 | 5/2003 | Gatto et al. |
| 2003/0100370 | A1 | 5/2003 | Gatto et al. |
| 2003/0100371 | A1 | 5/2003 | Gatto et al. |
| 2003/0100372 | A1 | 5/2003 | Gatto et al. |
| 2003/0115351 | A1 | 6/2003 | Giobbi |
| 2003/0119579 | A1 | 6/2003 | Walker et al. |
| 2003/0140134 | A1 | 7/2003 | Swanson et al. |
| 2003/0144052 | A1 | 7/2003 | Walker et al. |
| 2003/0162589 | A1 | 8/2003 | Nguyen et al. |
| 2003/0171149 | A1 | 9/2003 | Rothschild |
| 2003/0176219 | A1 | 9/2003 | Manfredi et al. |
| 2003/0181231 | A1 | 9/2003 | Vancura et al. |
| 2003/0188306 | A1 | 10/2003 | Harris et al. |
| 2003/0190941 | A1 | 10/2003 | Byrne |
| 2003/0195033 | A1 | 10/2003 | Gazdic et al. |
| 2003/0216182 | A1 | 11/2003 | Gauselmann |
| 2003/0224852 | A1 | 12/2003 | Walker et al. |
| 2003/0228904 | A1 | 12/2003 | Acres et al. |
| 2003/0228907 | A1 | 12/2003 | Gatto et al. |
| 2003/0228912 | A1 | 12/2003 | Wells et al. |
| 2003/0232650 | A1 | 12/2003 | Beatty |
| 2004/0002381 | A1 | 1/2004 | Alcorn et al. |
| 2004/0002385 | A1 | 1/2004 | Nguyen |
| 2004/0003389 | A1 | 1/2004 | Reynar et al. |
| 2004/0005919 | A1 | 1/2004 | Walker et al. |
| 2004/0009804 | A1 | 1/2004 | Dumont |
| 2004/0010700 | A1 | 1/2004 | Mont |
| 2004/0015423 | A1 | 1/2004 | Walker et al. |
| 2004/0023721 | A1 | 2/2004 | Giobbi |
| 2004/0024666 | A1 | 2/2004 | Walker et al. |
| 2004/0029635 | A1 | 2/2004 | Giobbi |
| 2004/0038723 | A1 | 2/2004 | Schneier et al. |
| 2004/0048657 | A1 | 3/2004 | Gauselmann |
| 2004/0048660 | A1 | 3/2004 | Gentles et al. |
| 2004/0048667 | A1 | 3/2004 | Rowe |
| 2004/0053664 | A1 | 3/2004 | Byrne |
| 2004/0053695 | A1 | 3/2004 | Mattice et al. |
| 2004/0054952 | A1 | 3/2004 | Morrow et al. |
| 2004/0063489 | A1 | 4/2004 | Crumby |
| 2004/0072604 | A1 | 4/2004 | Toyoda |
| 2004/0072608 | A1 | 4/2004 | Toyoda |
| 2004/0082385 | A1 | 4/2004 | Silva et al. |
| 2004/0092310 | A1 | 5/2004 | Brosnan et al. |
| 2004/0098597 | A1 | 5/2004 | Giobbi |
| 2004/0106452 | A1 | 6/2004 | Nguyen et al. |
| 2004/0116176 | A1 | 6/2004 | Tulley et al. |
| 2004/0124243 | A1 | 7/2004 | Gatto et al. |
| 2004/0127279 | A1 | 7/2004 | Gatto et al. |
| 2004/0132532 | A1 | 7/2004 | Brosnan et al. |
| 2004/0133485 | A1 | 7/2004 | Schoonmaker et al. |
| 2004/0142739 | A1 | 7/2004 | Loose et al. |
| 2004/0142742 | A1 | 7/2004 | Schneider et al. |
| 2004/0142747 | A1 | 7/2004 | Pryzby |
| 2004/0152509 | A1 | 8/2004 | Hornik et al. |
| 2004/0162144 | A1 | 8/2004 | Loose et al. |
| 2004/0166923 | A1 | 8/2004 | Michaelson et al. |
| 2004/0166940 | A1 | 8/2004 | Rothschild |
| 2004/0166942 | A1 | 8/2004 | Muir |
| 2004/0176162 | A1 | 9/2004 | Rothschild |
| 2004/0176167 | A1 | 9/2004 | Michaelson et al. |
| 2004/0179701 | A1 | 9/2004 | Boyd |
| 2004/0180721 | A1 | 9/2004 | Rowe |

| | | | | |
|---|---|---|---|---|
| 2004/0180722 | A1 | 9/2004 | Giobbi | |
| 2004/0185936 | A1 | 9/2004 | Block et al. | |
| 2004/0193726 | A1 | 9/2004 | Gatto et al. | |
| 2004/0198479 | A1 * | 10/2004 | Martinek et al. | 463/1 |
| 2004/0198489 | A1 | 10/2004 | Kaminkow et al. | |
| 2004/0198494 | A1 | 10/2004 | Nguyen et al. | |
| 2004/0198496 | A1 | 10/2004 | Gatto et al. | |
| 2004/0204244 | A1 | 10/2004 | Rathsack et al. | |
| 2004/0209685 | A1 | 10/2004 | Lucchesi et al. | |
| 2004/0214622 | A1 | 10/2004 | Atkinson | |
| 2004/0214627 | A1 | 10/2004 | Jordan et al. | |
| 2004/0214640 | A1 | 10/2004 | Giobbi | |
| 2004/0214641 | A1 | 10/2004 | Giobbi | |
| 2004/0215756 | A1 | 10/2004 | VanAntwerp et al. | |
| 2004/0219967 | A1 | 11/2004 | Giobbi et al. | |
| 2004/0219983 | A1 | 11/2004 | Giobbi | |
| 2004/0224770 | A1 | 11/2004 | Wolf et al. | |
| 2004/0229684 | A1 | 11/2004 | Blackburn et al. | |
| 2004/0229698 | A1 | 11/2004 | Lind et al. | |
| 2004/0229699 | A1 | 11/2004 | Gentles et al. | |
| 2004/0235559 | A1 | 11/2004 | Brosnan et al. | |
| 2004/0235563 | A1 | 11/2004 | Blackburn et al. | |
| 2004/0242298 | A1 | 12/2004 | Inamura et al. | |
| 2004/0242307 | A1 | 12/2004 | Laakso | |
| 2004/0242328 | A1 | 12/2004 | Blackburn et al. | |
| 2004/0242329 | A1 | 12/2004 | Blackburn et al. | |
| 2004/0242330 | A1 | 12/2004 | Blackburn et al. | |
| 2004/0242331 | A1 | 12/2004 | Blackburn et al. | |
| 2004/0243848 | A1 | 12/2004 | Blackburn et al. | |
| 2004/0243849 | A1 | 12/2004 | Blackburn et al. | |
| 2004/0248642 | A1 | 12/2004 | Rothschild | |
| 2004/0248645 | A1 | 12/2004 | Blackburn et al. | |
| 2004/0248646 | A1 | 12/2004 | Canterbury | |
| 2004/0248651 | A1 | 12/2004 | Gagner | |
| 2004/0254006 | A1 | 12/2004 | Lam et al. | |
| 2004/0254013 | A1 | 12/2004 | Quraishi et al. | |
| 2004/0254014 | A1 | 12/2004 | Quraishi et al. | |
| 2004/0254954 | A1 | 12/2004 | Gatto et al. | |
| 2004/0255139 | A1 | 12/2004 | Giobbi | |
| 2004/0259629 | A1 | 12/2004 | Michaelson et al. | |
| 2004/0259633 | A1 | 12/2004 | Gentles et al. | |
| 2004/0259640 | A1 | 12/2004 | Gentles et al. | |
| 2004/0259643 | A1 | 12/2004 | Gentles | |
| 2004/0266532 | A1 | 12/2004 | Blackburn et al. | |
| 2004/0266533 | A1 | 12/2004 | Gentles et al. | |
| 2005/0003886 | A1 | 1/2005 | Englman et al. | |
| 2005/0009599 | A1 | 1/2005 | Ryan | |
| 2005/0009601 | A1 | 1/2005 | Manfredi et al. | |
| 2005/0009607 | A1 | 1/2005 | Russell et al. | |
| 2005/0010738 | A1 | 1/2005 | Stockdale et al. | |
| 2005/0014559 | A1 | 1/2005 | Mattice et al. | |
| 2005/0032573 | A1 | 2/2005 | Acres et al. | |
| 2005/0032577 | A1 | 2/2005 | Blackburn et al. | |
| 2005/0037708 | A1 | 2/2005 | Torvinen | |
| 2005/0043072 | A1 | 2/2005 | Nelson | |
| 2005/0043088 | A1 | 2/2005 | Nguyen et al. | |
| 2005/0043090 | A1 | 2/2005 | Pryzby et al. | |
| 2005/0043094 | A1 | 2/2005 | Nguyen et al. | |
| 2005/0044535 | A1 | 2/2005 | Coppert | |
| 2005/0049037 | A1 | 3/2005 | Anderson et al. | |
| 2005/0054431 | A1 | 3/2005 | Walker et al. | |
| 2005/0054438 | A1 | 3/2005 | Rothschild et al. | |
| 2005/0054440 | A1 | 3/2005 | Anderson et al. | |
| 2005/0054441 | A1 | 3/2005 | Landrum et al. | |
| 2005/0054442 | A1 | 3/2005 | Anderson et al. | |
| 2005/0054445 | A1 | 3/2005 | Gatto et al. | |
| 2005/0054447 | A1 | 3/2005 | Hiroyama et al. | |
| 2005/0054448 | A1 | 3/2005 | Frerking et al. | |
| 2005/0059457 | A1 | 3/2005 | Rothschild et al. | |
| 2005/0059493 | A1 | 3/2005 | Tyson et al. | |
| 2005/0059494 | A1 | 3/2005 | Kammler | |
| 2005/0064935 | A1 | 3/2005 | Blanco | |
| 2005/0064939 | A1 | 3/2005 | McSheffrey et al. | |
| 2005/0071023 | A1 | 3/2005 | Gilliland et al. | |
| 2005/0075983 | A1 | 4/2005 | St. Denis | |
| 2005/0081623 | A1 | 4/2005 | Frank | |
| 2005/0086286 | A1 | 4/2005 | Gatto et al. | |
| 2005/0090313 | A1 | 4/2005 | Rowe | |
| 2005/0096114 | A1 | 5/2005 | Cannon et al. | |
| 2005/0096121 | A1 | 5/2005 | Gilliland et al. | |
| 2005/0096133 | A1 | 5/2005 | Hoefelmeyer et al. | |
| 2005/0097342 | A1 | 5/2005 | Gatto et al. | |
| 2005/0101370 | A1 | 5/2005 | Lind et al. | |
| 2005/0113172 | A1 | 5/2005 | Gong | |
| 2005/0114272 | A1 | 5/2005 | Herrmann et al. | |
| 2005/0119045 | A1 | 6/2005 | Fujimoto | |
| 2005/0119046 | A1 | 6/2005 | Fujimoto | |
| 2005/0137012 | A1 | 6/2005 | Michaelson | |
| 2005/0148385 | A1 | 7/2005 | Michaelson | |
| 2005/0159218 | A1 | 7/2005 | Blanco | |
| 2005/0261060 | A1 | 11/2005 | Nguyen et al. | |
| 2005/0261061 | A1 | 11/2005 | Nguyen et al. | |
| 2005/0277469 | A1 | 12/2005 | Pryzby et al. | |
| 2005/0282629 | A1 | 12/2005 | Gagner | |
| 2005/0282631 | A1 | 12/2005 | Bonney et al. | |
| 2005/0282638 | A1 | 12/2005 | Rowe | |
| 2006/0009273 | A2 | 1/2006 | Moshal | |
| 2006/0009280 | A1 | 1/2006 | Joshi et al. | |
| 2006/0019747 | A1 | 1/2006 | Loose et al. | |
| 2006/0019750 | A1 | 1/2006 | Beatty | |
| 2006/0030409 | A1 | 2/2006 | Lechner et al. | |
| 2006/0031829 | A1 | 2/2006 | Harris et al. | |
| 2006/0035705 | A1 | 2/2006 | Jordan et al. | |
| 2006/0036573 | A1 | 2/2006 | Watanabe et al. | |
| 2006/0039132 | A1 | 2/2006 | Chen | |
| 2006/0040732 | A1 | 2/2006 | Baerlocher et al. | |
| 2006/0046839 | A1 | 3/2006 | Nguyen | |
| 2006/0073881 | A1 | 4/2006 | Pryzby et al. | |
| 2006/0084502 | A1 | 4/2006 | Downs et al. | |
| 2006/0094508 | A1 | 5/2006 | D'Amico et al. | |
| 2006/0143085 | A1 | 6/2006 | Adams et al. | |
| 2006/0148561 | A1 | 7/2006 | Moser | |
| 2006/0194633 | A1 | 8/2006 | Paulsen | |
| 2006/0287107 | A1 | 12/2006 | Okada | |
| 2007/0006708 | A1 | 1/2007 | Laakso | |
| 2007/0021185 | A1 | 1/2007 | Gauselmann | |

FOREIGN PATENT DOCUMENTS

| | | | |
|---|---|---|---|
| EP | 0945837 | A2 | 9/1999 |
| EP | 0 978 809 | A2 | 2/2000 |
| EP | 0 993 847 | | 4/2000 |
| EP | 0 997 856 | A2 | 5/2000 |
| EP | 0 997 857 | A2 | 5/2000 |
| EP | 1 000 642 | | 5/2000 |
| EP | 1004970 | | 5/2000 |
| EP | 1 079 345 | A1 | 2/2001 |
| EP | 1 225 565 | A2 | 7/2002 |
| EP | 1199690 | | 2/2004 |
| EP | 0813132 | | 1/2005 |
| EP | 1439507 | A3 | 3/2005 |
| GB | 2 098 778 | | 11/1982 |
| GB | 2 201 279 | A | 8/1988 |
| JP | 11197292 | A | 12/1997 |
| JP | 11216221 | | 8/1999 |
| JP | 411216221 | A | 8/1999 |
| JP | 200107466 | | 4/2000 |
| JP | 2000107466 | A | 4/2000 |
| JP | 02000296209 | A | 10/2000 |
| JP | 2001062029 | | 3/2001 |
| JP | 2001062029 | A | 3/2001 |
| JP | 2003290422 | A | 10/2003 |
| WO | WO 97/32285 | | 9/1997 |
| WO | WO 9835309 | | 8/1998 |
| WO | WO 9941718 | | 8/1999 |
| WO | WO 9965579 | | 12/1999 |

| | | | |
|---|---|---|---|
| WO | WO 0025281 | | 5/2000 |
| WO | WO 0161437 | | 8/2001 |
| WO | WO 02/17295 | | 2/2002 |
| WO | WO 2004/014501 | A2 | 2/2004 |
| WO | WO 2004/025583 | | 3/2004 |
| WO | WO 2005026894 | | 3/2004 |
| WO | WO 2005113089 | | 12/2005 |
| WO | WO 2005113091 | | 12/2005 |
| WO | WO 2005114598 | | 12/2005 |
| WO | WO 2005117647 | | 12/2005 |
| WO | WO 2005120127 | | 12/2005 |
| WO | WO 2006017036 | | 2/2006 |
| WO | WO 2006017445 | | 2/2006 |
| WO | WO 2007044175 | | 4/2007 |

OTHER PUBLICATIONS

Game King Series Advertisement, written by IGT, published in 1998.
Game King Triple Play Draw Poker Advertisement, written by IGT, published in 1998.
Article, "A Salute to Game Shows-The Price Is Right-Pricing Games-Three Strikes," p. 8 of 9, [online], [retrieved on Aug. 16, 2000]. Retrieved from the Internet: <http://ben-schumin.simplenet.com/game-shows/shows/price-is-right/pricing-games-4.htm>.
Article, "Frankie & Annette's Beach Party Bally Gaming," published by Strictly Slots, Dec. 2001.
Article, "Megaman X's Soundcard History Museum," [online] pp. 1-5, [retrieved on May 11, 2000] retrieved on Internet at <http://digitalparadise.cgocable.ca/MegaMan_X/Soundcards>.
Article, "Microprocessor Report," pp. 2, 12-17, published by Micro Design Resources on Mar. 25, 1996.
Article, "Monopoly Movers & Shakers Williams/WMS Gaming," published by Strictly Slots publication in Jul. 2000.
Bally Gaming, Inc., "Frankie & Annette's Beach Party (EVO Hybrid),"[online] [retrieved on Jan. 9, 2004]. Retrieved from the internet <URL: http://www.ballygaming.com/gameroom/games.asp?gameID=664>.
Brochure of Bally Gaming, Inc., "EVO Hybrid Frankie & Annette's Beach Party," published by Bally Gaming, Inc. in the year 2001 on or before December thereof.
Brochure of IGT, "Leopard Spots, Double Diamond 2000, Little Green Men, Elephant King, I Dream of Jeannie," available in Oct. 1999.
Brochure of IGT, "Run for Your Money S-Plus Limited," published in the year 1998 on or before December thereof.
Brochure of IGT, "Top Dollar S-Plus Limited," published in the year 1998 on or before December thereof.
Brochure of IGT, "Totem Pole," written by IGT, available in the year 1997, on or before December thereof.
Brochure of IGT, "Wheel of Fortune," published in the year 1998 on or before December thereof.
Brochure of WMS Gaming Inc., "Meet the Next Generation of Monopoly Slot Machines from WMS Gaming!" published by Hasbro, Inc. in the year 1999 on or before December thereof.
Brochure of WMS Gaming Inc., "Monopoly Chairman of the Board," published by Hasbro, Inc. in the year 1999 on or before December thereof.
Brochure of WMS Gaming Inc., "Monopoly Once Around," published by Hasbro, Inc. in the year 1998 on or before December thereof.
Brochure of WMS Gaming Inc., "Monopoly Reel Estate," published by Hasbro, Inc. in the year 1998 on or before December thereof.
Brochure of WMS Gaming Inc., "Movers & Shakers," published by Hasbro, Inc. in the year 2000 on or before December thereof.
Chutes and Ladders CD-ROM Game, Hasbro Interactive, Inc., available in the year 1999 on or before December thereof.
Cliff Hanger [online], [retrieved on Mar. 21, 2001]. Retrieved from the Internet, <URL: http://www.geocities.com/Hollywood/Set/9859/tpir/tpir10.html>.
Cliff Hangers [online], [retrieved on Mar. 21, 2001]. Retrieved from the Internet, <URL: http://members.aol.com/schmoliktpir/hangers.html>.
Cliff Hangers Bonus and Plinko Bonus Advertisement published prior to Sep. 9, 2003.
Definition of Pitch, Merriam-Webster's Collegiate Dictionary, Tenth Edition, p. 886, 1999, on or before December thereof.
Description of Accelerated Credit Roll-Up in Gaming Machines written by IGT, available in the year 1999 on or before December thereof.
Description of Action Prompts in Gaming Machines, written by IGT, available in the year 1999 on or before December thereof.
Description of Last Sound in Credit Roll-Up in Gaming Machines written by IGT, available in the year 2000 on or before December thereof.
Description of Lighting Features in Gaming Machines, written by IGT, available in the year 1999 on or before December thereof.
Description of Maximum Wager Sound and Bet Sounds in Gaming Devices written by IGT, available in the year 2000 on or before December thereof.
Description of Payout Sound Feature in Gaming Machine written by IGT, available in the year 1999 on or before December thereof.
Description of Progressive Sound Feature in Pinball and Video Games written by IGT, available in the year 1999 on or before December thereof.
Description of Sound Effects in Gaming Devices written by IGT, available in the year 2000 on or before December thereof.
Description of Sound Feature in Totem Pole™ Gaming Machine written by IGT, available in the year 1997 on or before December thereof.
Description of Tempo Change In Gaming Machines written by IGT, available in the year 2000 on or before December thereof.
Description of Verbal Wager Feature in "Dick Clark" Gaming Machine written by IGT, available in the year 2000 on or before December thereof.
Description of Volume Control Functions in Gaming Machines written by IGT, available in the year 1999 on or before December thereof.
FRIED, Ian, CNET News.com, Microsoft Releases XP for Slot Machines, [online], [retrieved on Nov. 28, 2001]. Retrieved from the Internet <URL:http://news.com.com/XP+for+slot+machines%2C+ATMs+released/2100-1040_3-276302.html>.
IGT, "Elephant King,"[online], [retrieved on Mar. 21, 2001]. Retrieved from the Internet URL:http://www.igt.com/games/new_games/elephant.html.
MIDI Media Adaptation Layer for IEEE-1394, published by the Association of Musical Electronics Industry in Tokyo, Japan and The MIDI Manufacturers Association in Los Angeles, California, Nov. 30, 2000, pp. 1-17.
Press Release, "WMS Gaming's Monopoly Slot Machines Named 1998's Most Innovative Gaming Product At The American Gaming, Lodging and Leisure Summit," published by WMS Gaming Inc. on Jan. 13, 1999.
Screen Shot and Description by IGT of "Free Spins Bonus (Elephant King)" written by IGT, available in Oct. 1999.
Screen Shots of "Race Car Bonus Feature" written by IGT, available in the year 1998 on or before December thereof.
Slots 2003, written by Melissa Raimondi, published in Jan. 2003.
The Java™ Tutorial, "What Can Java Technology Do?" [online]. pp. 1-2 [retrieved on Oct. 16, 2000]. Retrieved from the Internet URL:http://java.sun.com/docs/books/tutorial/getStarted/i.../definition.htm.
The MIDI File Format, [online]. pp. 1-10 [retrieved on Dec. 28, 2001]. Retrieved from the Internet URL: http://crystal.capana.org.au/ghansper/midi_introduction/midi_file_format.html.
The Price is Right Featuring Plinko Advertisement written by IGT, published in 2001, on or before December thereof.
The Price is Right Plinko written by IGT, published in Dec. 2001.
Cliff Hangers advertisement web page http://www.geocities.com/Hollywood/Set/9859/tpir/tpir10.html printed on Mar. 21, 2001.
Office Action dated Oct. 26, 2005 for U.S. Appl. No. 10/659,093.
Office Action dated Mar. 13, 2007 for U.S. Appl. No. 10/659,093.
Office Action dated Sep. 25, 2007 for U.S. Appl. No. 10/659,093.
Cash Chameleon Brochure written by Aristocrat.
Description of Animating Symbol Feature in Gaming Machines.
Banana-Rama Brochure written by Silicon Gaming.

Break the Spell Brochure written by Atronics, published in 1999.
Jazzy Jackpots Advertisements written by Atronic, published in 2000.
Jazzy Jackpots Article written by Strictly Slots, published in Mar. 2001.
American Heritage Dictionary of the English Language, definition of “correspond”. Fourth Edition, Publish by Houghton Nifflin Company 2006. Online at http://dictionary.reference.com, obtained Sep. 14, 2007.
Bally Live-Server Based Gaming brochure, written by Bally Gaming Systems, published in 2006.
Bonusing Solutions without Limits brochure, written by Bally Gaming Systems, published in 2005.
Cliff Hangers article web page http://members.aol.com/schmoliktpir.hangers.html, printed on Mar. 21, 2001.
Office Action dated May 9, 2006 for U.S. Appl. No. 10/659,093.
Office Action dated Jul. 24, 2008 for U.S. Appl. No. 10/659,093.
Office Communication dated May 16, 2008 for U.S. Appl. No. 10/953,123.
SB Products - The Next Big Innovation, printed from www.igt.com in Aug. 2006.
Server Based: Other Possibilities Article; published by www.casinocenter.com in May 2006.
Transferring Gaming brochure, written by Cyberview Technology, published in 2006.

* cited by examiner

GAMING DEVICE HAVING TOUCH ACTIVATED ALTERNATING OR CHANGING SYMBOL

PRIORITY CLAIM

This application is a continuation application of U.S. patent application Ser. No. 09/602,331, filed Jun. 23, 2000, now U.S. Pat. No. 6,731,313 entitled "Gaming Device Having Touch Activated Alternating Or Changing Symbol."

CROSS-REFERENCE TO RELATED APPLICATIONS

This application is related to the following commonly-owned patent applications: "GAMING DEVICE WITH TRAVELING REEL SYMBOLS," Ser. No. 09/689,197, now U.S. Pat. No. 6,565,433; "GAMING DEVICE WITH MOVING SCREEN SIMULATION," Ser. No. 09/625,884, now U.S. Pat. No. 6,837,790; "GAMING DEVICE PROVIDING TOUCH ACTIVATED SYMBOL INFORMATION," Ser. No. 09/680,349, now U.S. Pat. No. 6,939,223; "GAMING DEVICE HAVING INTERACTING SYMBOLS," Ser. No. 09/686,308, now U.S. Pat. No. 6,981,635; "GAMING DEVICE HAVING CHANGED OR GENERATED PLAYER STIMULI," Ser. No. 09/686,244, now U.S. Pat. No. 6,739,973; "GAMING DEVICE HAVING INDEPENDENT REEL COLUMNS," Ser. No. 10/165,260, now U.S. Pat. No. 7,001,274; "GAMING DEVICE WITH A BONUS SCHEME HAVING REPEATED SELECTION OF VALUE SETS WITH OPTION TO SAVE VALUES," Ser. No. 10/231,639, now U.S. Pat. No. 7,229,350; "GAMING DEVICE WITH TRAVELING REEL SYMBOLS," Ser. No. 10/409,965, "GAMING DEVICE WITH TRAVELING REEL SYMBOLS," Ser. No. 10/409,727, now U.S. Pat. No. 6,918,832; "GAMING DEVICE HAVING A CASH OUT MENU SCREEN AND A SYSTEM AND METHOD FOR ENABLING A PLAYER TO RETRIEVE MONEY FROM A GAMING DEVICE," Ser. No. 10/439,357, now U.S. Pat. No. 6,835,134; "GAMING DEVICE HAVING MULTIPLE SELECTABLE DISPLAY INTERFACES," Ser. No. 10/659,093, "GAMING DEVICE WITH MULTI-PURPOSE REELS," Ser. No. 10/023,268, now U.S. Pat. No. 6,702,675; "GAMING DEVICE HAVING A CASH OUT MENU SCREEN AND A SYSTEM AND METHOD FOR ENABLING A PLAYER TO RETRIEVE MONEY FROM A GAMING DEVICE," Ser. No. 10/767,243, "GAMING DEVICE HAVING INDEPENDENT REEL COLUMNS," Ser. No. 11/327,803, now U.S. Pat. No. 7,309,281; "GAMING DEVICE HAVING INDEPENDENT REEL COLUMNS," Ser. No. 11/326,787"GAMING DEVICE HAVING INDEPENDENT REEL COLUMNS," Ser. No. 11/355,304, now U.S. Pat. No. 7,309,282; "GAMING DEVICE HAVING CHANGED OR GENERATED PLAYER STIMULI," Ser. No. 10/841,014, now U.S. Pat. No. 7,258,613; "GAMING DEVICE HAVING MULTIPLE SELECTABLE DISPLAY INTERFACES BASED ON PLAYER'S WAGERS,: Ser. No. 10/953,123, "GAMING DEVICE WITH MOVING SCREEN SIMULATION," Ser. No. 10/982,157, now U.S. Pat. No. 7,156,740; "GAMING DEVICE HAVING A CASH OUT MENU SCREEN AND A SYSTEM AND METHOD FOR ENABLING A PLAYER TO RETRIEVE MONEY FROM A GAMING DEVICE," Ser. No. 11/014,078, and "GAMING DEVICE PROVIDING TOUCH ACTIVATED SYMBOL INFORMATION," Ser. No. 11/156,009, now U.S. Pat. No. 7,281,977.

COPYRIGHT NOTICE

A portion of the disclosure of this patent document contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device that enables a player to change or alter certain symbols displayed on the reels of the gaming device, which form random combinations of symbols that may yield an award.

BACKGROUND OF THE INVENTION

Gaming device manufactures have long provided gaming machines employing a plurality of reels, wherein the reels each have a plurality of symbols. In the 1930's, gaming device manufacturers provided a three reel gaming device, wherein each reel had ten stops, which produced a thousand combinations. One way for the manufacturers to increase the number of combinations was to increase the size of the reel and to add more stops. During the next four decades, the reels in the gaming devices increased to twenty stops. In the 1970's, manufacturers developed a twenty-two stop reel machine, in the early 80's a twenty-five stop reel machine, and in 1985, IGT, the assignee of the present invention, developed a thirty-two stop reel machine. This three-reel machine had 32,768 possible combinations.

Another way manufacturers increased the number of combinations was to add reels. In 1955, a manufacturer produced a four-reel slot machine, which increased the number of combinations on a twenty stop machine to 160,000. In the middle 1970's, a manufacturer produced the first five-reel slot machine, which had twenty-two stop reels and produced combinations in excess of five million.

The next advancement in the effort to produce more payout combinations was the video or CRT screen slot machine, wherein the reels were simulated as opposed to mechanical. Video slot machines do not have mechanical drums or reels which rotate, do not need to precisely stop the same at certain positions and are therefore not limited by a maximum allowable drum radius. Each reel can have an unlimited number of stops. Initially, the Nevada gaming Commission limited the stops on the video machines (e.g., 84 stops on a three reel machine) but has since removed the limit. In 1989, a particular video reel machine employed reels having hundreds of stops and more than 10 million combinations.

The total number of combinations affects the percentage of time that a player will obtain a particular winning combination as well as the overall payout percentage of the machine. For example, a three reel machine having twenty-two stops per reel, wherein the first reel has two oranges, the second reel has three oranges, and the third reel has seven oranges will yield an orange, orange and orange combination 42 times in every 10,648 plays (22×22×22) or 0.39% of the time. If the orange, orange, orange combination pays 20 coins, then the total coins paid is 20×42 or 840 coins in every 10,648 plays.

Adding the total coins paid for each winning combination and dividing that number by 10,648 yields the machine's total payout percentage.

It should be appreciated that in the known gaming systems, the percentage of obtaining a winning combination is predetermined. In certain known progressive gaming machines, the payout of a grand prize grows each time a player plays the machine. The increasing payout increases the total coins paid as determined above, which in turn increases the overall payout percentage. Nevertheless, the percentage of times that a player will receive one of the combinations remains constant.

To increase player enjoyment and excitement, it is desirable to provide players with new types of gaming devices that attract the player and keep the player entertained. One way to hold a player's interest is to vest the player with the ability to affect the determination of the outcome. That is, to give the player a stake or "say so" in the manner in which the gaming device determines the player's outcome. Certain known gaming devices have bonus rounds, wherein a player selects the player's own fate. For example, European Patent Application No. EP 0 945 837 A2 filed on Mar. 18, 1999 and assigned on its face to WMS Gaming, Inc. discloses a gaming device having a bonus round, wherein a player chooses a masked symbol from a pattern of symbols, and the gaming device removes the mask and either awards the player with a bonus value or terminates the bonus round with a bonus terminator. The player chooses until selecting a bonus terminator. However, known gaming devices have yet to add similar player selectivity to the base game or reel operation of the gaming device.

SUMMARY OF THE INVENTION

The present invention overcomes the above shortcomings by enabling the player to choose or alter certain symbols displayed on the reels of the gaming device. The reels of a gaming machine, even in video form, each contain a set number of stops. Of those stops, the present invention designates or assigns certain stops to have changeable symbols. In a multiple reel gaming device, each reel may or may not have one or more changeable symbols.

The present invention enables the player to change or select the changeable symbol at any time as long as the reels are not in motion. The present invention contemplates letting a potential player who has yet to place money in the gaming device toggle through and peruse the various selections that the player can make. While playing the device, the player can select or change a changeable symbol at any time, and the gaming device maintains the change until the player (or another player) changes the symbol again.

The present invention preferably provides a touch screen video monitor in which the reels and associated stops are simulated. The touch screen enables the player to simply touch the symbol that the player wishes to change. Alternatively, the gaming device can provide a bare video monitor or television screen that merely displays the symbols. In this embodiment, the gaming device provides extra input devices such as push-buttons that enable the player to toggle though the selection of changeable symbols.

The gaming device contemplates the act of pressing a single changeable symbol or pushbutton having a plurality of effects. One effect that the act of pressing a symbol or button has is to change the selected symbol and nothing more. In this embodiment, each changeable symbol is individually selectable. In other embodiments, one or more changeable symbols are linked. For example, in one embodiment, changing a symbol changes all like symbols on the same reel. In another embodiment, changing a symbol changes all like symbols on the same payline. In a further embodiment, changing a symbol changes all like symbols displayed on the video monitor. In a still further embodiment, changing a symbol changes all like symbols on everyone of the stops of the gaming device.

A stop having changeable symbols may have two or more possibilities. That is, a person may toggle through and select from two, three, four, or any number of possible symbols that the implementor wishes to provide. Different stops can have different symbols and a different number of symbols from which to choose. Preferably, the choices follow a theme that the gaming device employs. For example, one embodiment of the present invention contains symbols relating to oriental food dishes and drinks. The gaming device enables the player to toggle or change between a "MSG" symbol or a "NO MSG" symbol. The player can therefore select which symbol with which the player desires to play the game.

The present invention preferably provides an audio display or production that coincides with the change or selection of a new symbol. The production can prompt the player, e.g., "Would you like "MSG" or "NO MSG?". Alternatively, the production can acknowledge a player's choice e.g., "MSG, NO MSG, You have selected NO MSG." A separate video display or screen on the video monitor can enhance or increase enjoyment through a suitable demonstration that corresponds to a symbol change.

At least one and preferably a greater percentage of the winning combinations of symbols maintained by the gaming device contain at least one changeable or selectable symbol. In this way, changing the symbol has a direct affect upon whether the player succeeds and wins an award. The changeable symbols also enable the player to establish personal preferences on the symbols, which vest the player in the outcome of the gaming device and provide additional enjoyment and entertainment for the player.

It is therefore an object of the present invention to provide a gaming device that enables a player to change one or more symbols on a random outcome generating reel of a gaming device.

Another object of the present invention is to enable the player to make selections that directly affect the outcome of playing the gaming device.

Yet another object of the present invention is to vest the player in the gaming device by enabling said player to establish personal preferences through the selection of changeable symbols.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1:
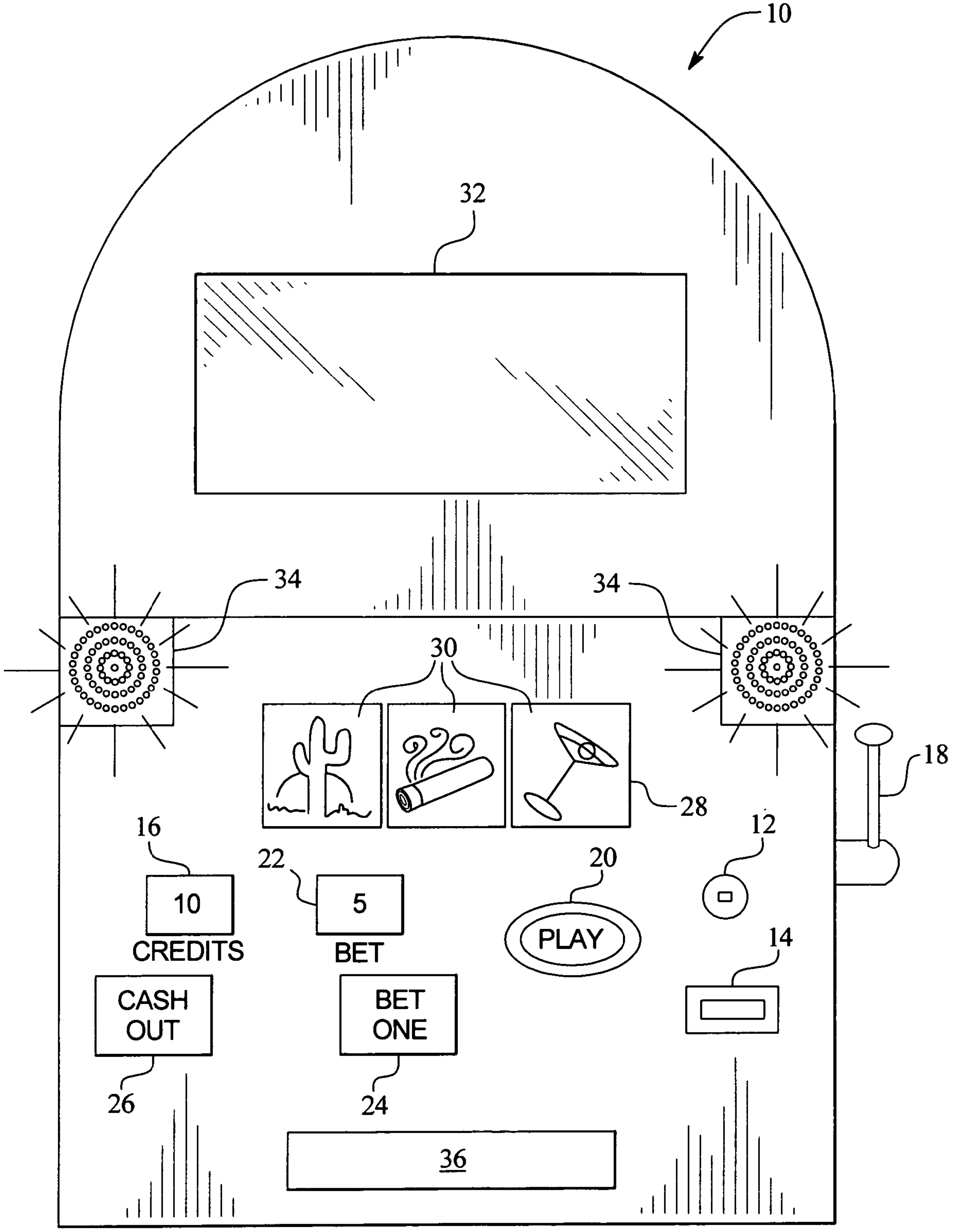
FIG. 1 is a front plan view of the general configuration of the gaming device of the present invention.

Referring now to the drawings, FIG. 1 generally illustrates a gaming device 10 of one embodiment of the present invention, which is preferably a slot machine having the controls, displays and features of a conventional slot machine. Gaming device 10 is constructed so that a player can operate gaming device 10 while standing or sitting. However, it should be appreciated that gaming device 10 can be constructed as a pub-style table-top game (not shown) that a player can operate preferably while sitting. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform. Gaming device 10 can incorporate any game such as slot, poker or keno. The symbols used on and in gaming device 10 may be in mechanical, electrical or video form.

As illustrated in FIG. 1, gaming device 10 includes a coin slot 12 and bill acceptor 14 where the player inserts money, coins or tokens. The player can place coins in the coin slot 12 or paper money in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18, pushing play button 20. Play button 20 can be any play activator used by the player which starts any game or sequence of events in the gaming device.

Referring to FIG. 1, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

Gaming device 10 also has a display window 28 which contains a plurality of reels 30, preferably three to five reels in mechanical or video form. Each reel 30 displays a plurality of symbols such as bells, hearts, martinis, fruits, cactuses, numbers, cigars, letters, bars or other images which preferably correspond to a theme associated with the gaming device 10. If the reels 30 are in video form, the gaming device 10 preferably displays the video reels 30 at video monitor 32 instead of at display window 28. Furthermore, gaming device 10 preferably includes speakers 34 for making sounds or playing music.

At any time during the game, a player may "cash out" and thereby receive a number of coins corresponding to the number of remaining credits by pushing a cash out button 26. When the player "cashes out," the player receives the coins in a coin payout tray 36. The gaming device 10 may employ other payout mechanisms such as credit slips redeemable by a cashier or electronically recordable cards which keep track of the player's credits.

Figure 2:
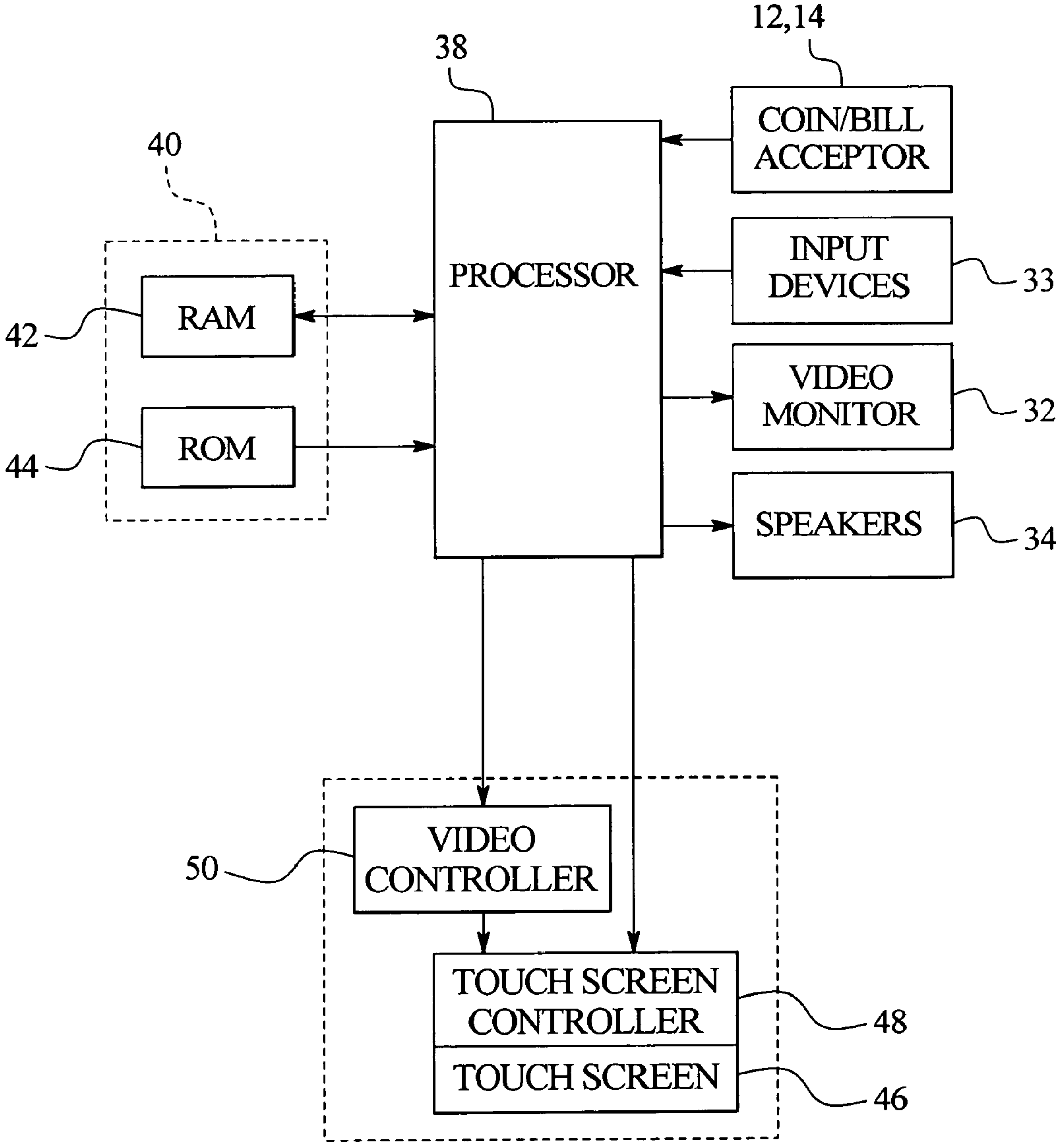
FIG. 2 is a schematic block diagram of the electronic configuration of one embodiment of the gaming device of the present invention.

With respect to electronics, the controller of gaming device 10 preferably includes the electronic configuration generally illustrated in FIG. 2, which has: a processor 38; a memory device 40 for storing program code or other data; a video monitor 32 or other display device (i.e., a liquid crystal display); a plurality of speakers 34; and at least one input device as indicated by block 33. The processor 38 is preferably a microprocessor or microcontroller-based platform which is capable of displaying images, symbols and other indicia such as images of people, characters, places, things and faces of cards. The memory device 40 can include random access memory (RAM) 42 for storing event data or other data generated or used during a particular game. The memory device 40 can also include read only memory (ROM) 44 for storing program code which controls the gaming device 10 so that it plays a particular game in accordance with applicable game rules and pay tables.

As illustrated in FIG. 2, the player preferably uses the input devices 33, such as the arm 18, play button 20, the bet one button 24 and the cash out button 26 to input signals into gaming device 10. Furthermore, it is preferable that touch screen 46 and an associated touch screen controller 48 are used instead of a conventional video monitor 32. Touch screen 46 and touch screen controller 48 are connected to a video controller 50 and processor 38. A player can make decisions and input signals into the gaming device 10 by touching touch screen 46 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. For purposes of describing the invention, the controller includes the processor 38 and memory device 40.

Referring to FIGS. 1 and 2, to operate the gaming device 10, the player must insert the appropriate amount of money or tokens at coin slot 12 or bill acceptor 14 and then pull the arm 18 or push the play button 20. The reels 30 will then begin to spin. Eventually, the reels 30 will come to a stop. As long as the player has credits remaining, the player can spin the reels 30 again. Depending upon where the reels 30 stop, the player may or may not win additional credits.

Gaming Device Apparatus

Figure 3:
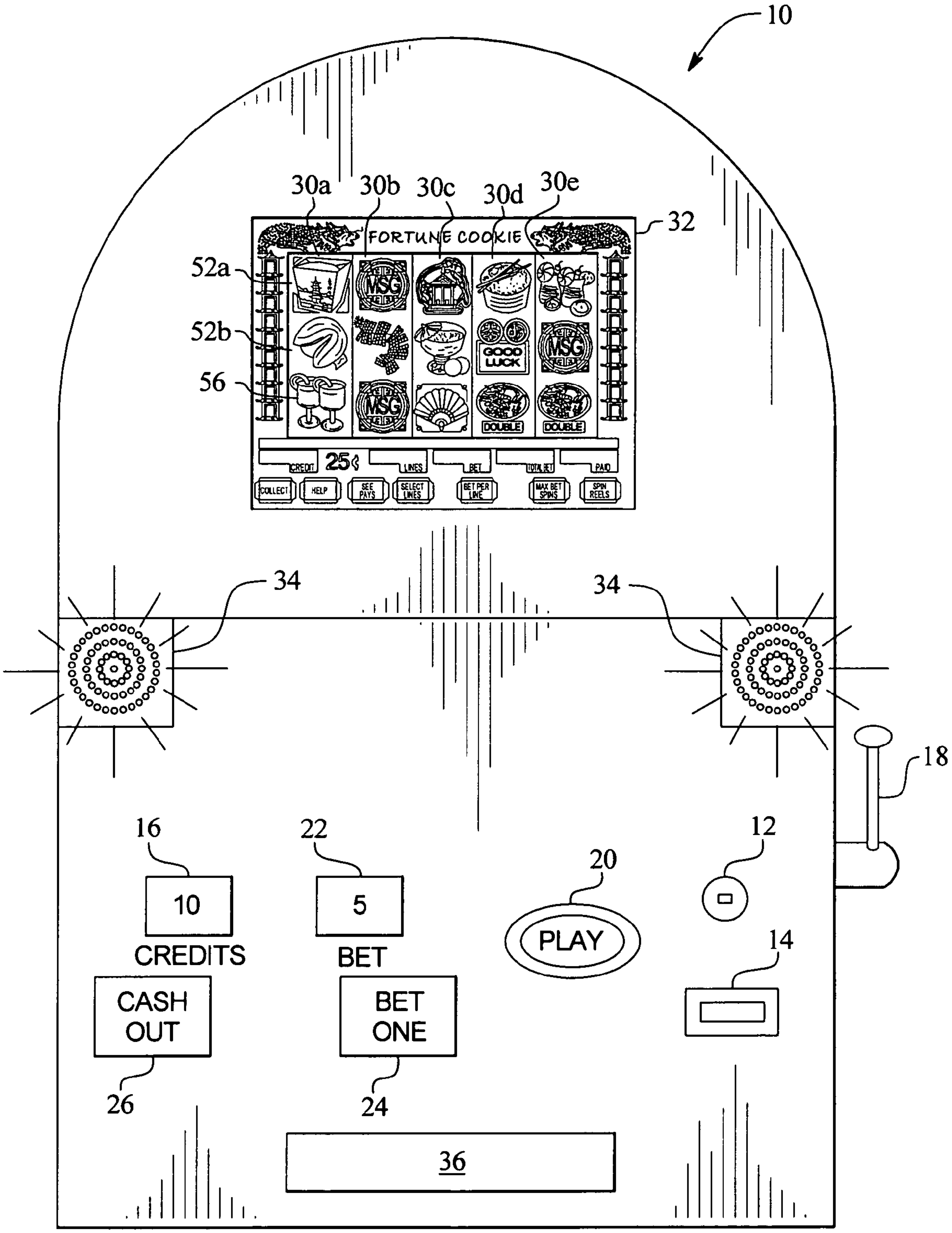
FIG. 3 is a front plan view of one embodiment of the gaming device of the present invention that illustrates a touch screen video monitor with a plurality of selectable or changeable reel stops.

Referring to FIG. 3, the present invention preferably employs a video monitor 32 having a touch screen 46 and touch screen controller 48 (shown in FIG. 2). Therefore, FIG. 3 does not display the display window 28 described with respect to FIG. 1. Accordingly, the video reels 30 are displayed in the video monitor 32. The embodiment displayed in FIG. 3 has five reels 30*a*, 30*b*, 30*c*, 30*d*, and 30*e*. The present invention contemplates providing any number of reels, preferably, the present invention provides three to five reels.

The embodiment displayed in FIG. 3 also has three paylines 52*a*, 52*b*, and 52*c*. This embodiment shows a known type of gaming machine called a "line machine" which has multiple paylines which display a plurality of rows of symbols from the reels 30 as illustrated in FIG. 3. The line machines are distinguishable from the gaming machine displayed in FIG. 1 that has only one row of symbols or one payline. The multiple rows present multiple opportunities for the player to obtain a winning combination of symbols. Usually, players have to bet or pay more to obtain the benefit of the multiple lines. For illustration purposes, the present invention is described in connection with a line machine, however, the present invention contemplates employing single payline machines such as shown in FIG. 1.

Figure 4:
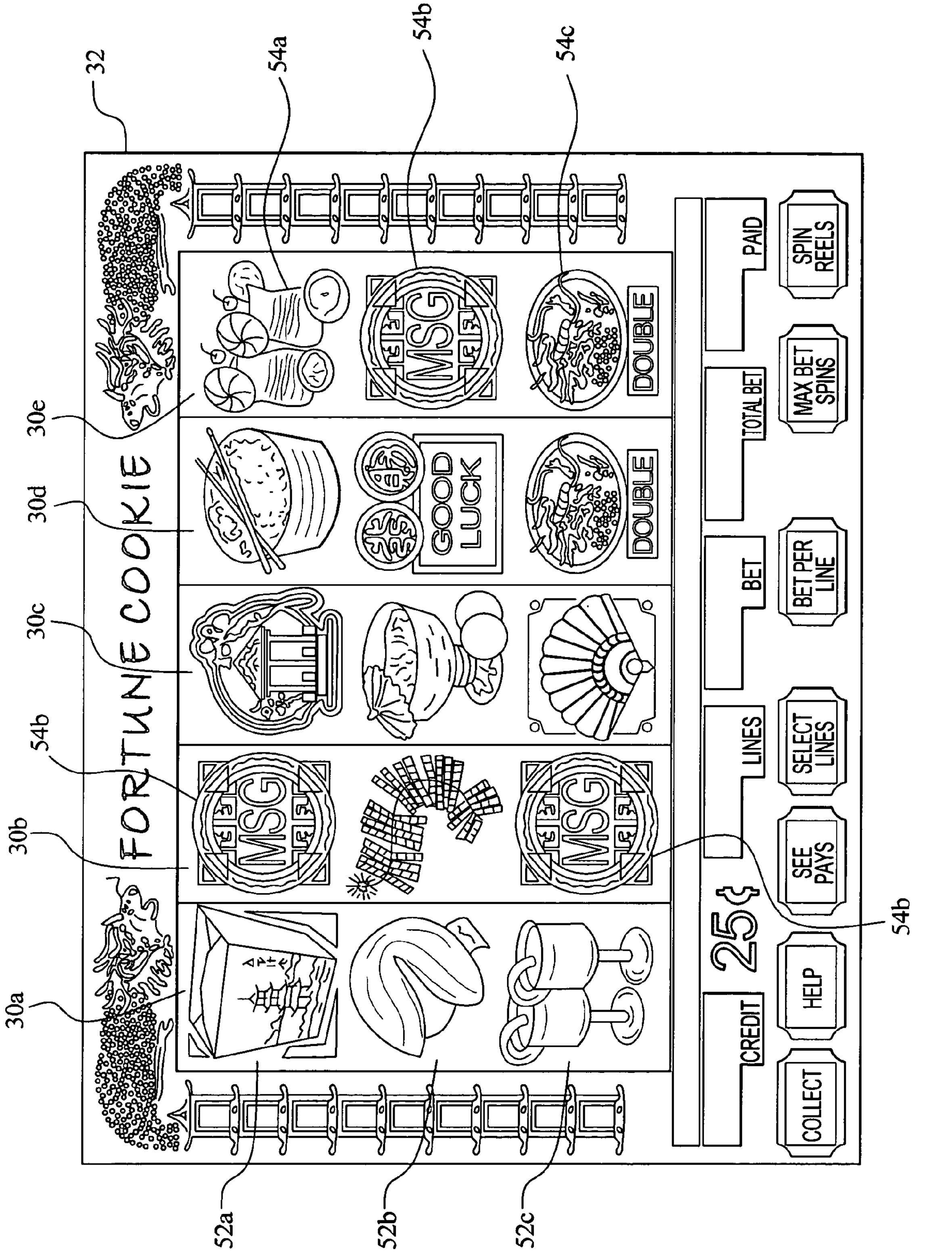
FIG. 4 is front plan view of one embodiment of the display of the video monitor of the gaming device having selectable or changeable reel stops.

Referring now to FIG. 4, an enlarged video screen 32 having a touch screen 46 and a touch screen controller 48 (shown in FIG. 2) displays the reels 30*a* through 30*e* and the paylines 52*a* through 52*c* described above. Each reel displays a plurality of symbols 54. For example, reel 30*e* displays the symbols 54*a*, 54*b* and 54*c*. The present invention contemplates enabling the player to change one or more of the symbols 54. Preferably, the present invention enables the player to change like symbols regardless of the reel on which they appear. For example, in one embodiment the present invention enables the player to change the "MSG" symbol 54*b* on reel 30*e*. The player can likewise change the "MSG" symbols 54*b* on the reel 30*b*.

In this embodiment, the present invention only enables the player to change the "MSG" symbol 54*b*, and its counterpart described below. However, the present invention contemplates enabling the player to change a plurality of symbols. For example, the present invention contemplates enabling the player to change the "DOUBLE DRAGON" symbol 54*c* as well as the "MSG" symbol. The implementor of the gaming device can enable a player to change any number of symbols in accordance with the gaming device theme and the payout structure of the gaming device.

Figure 5:
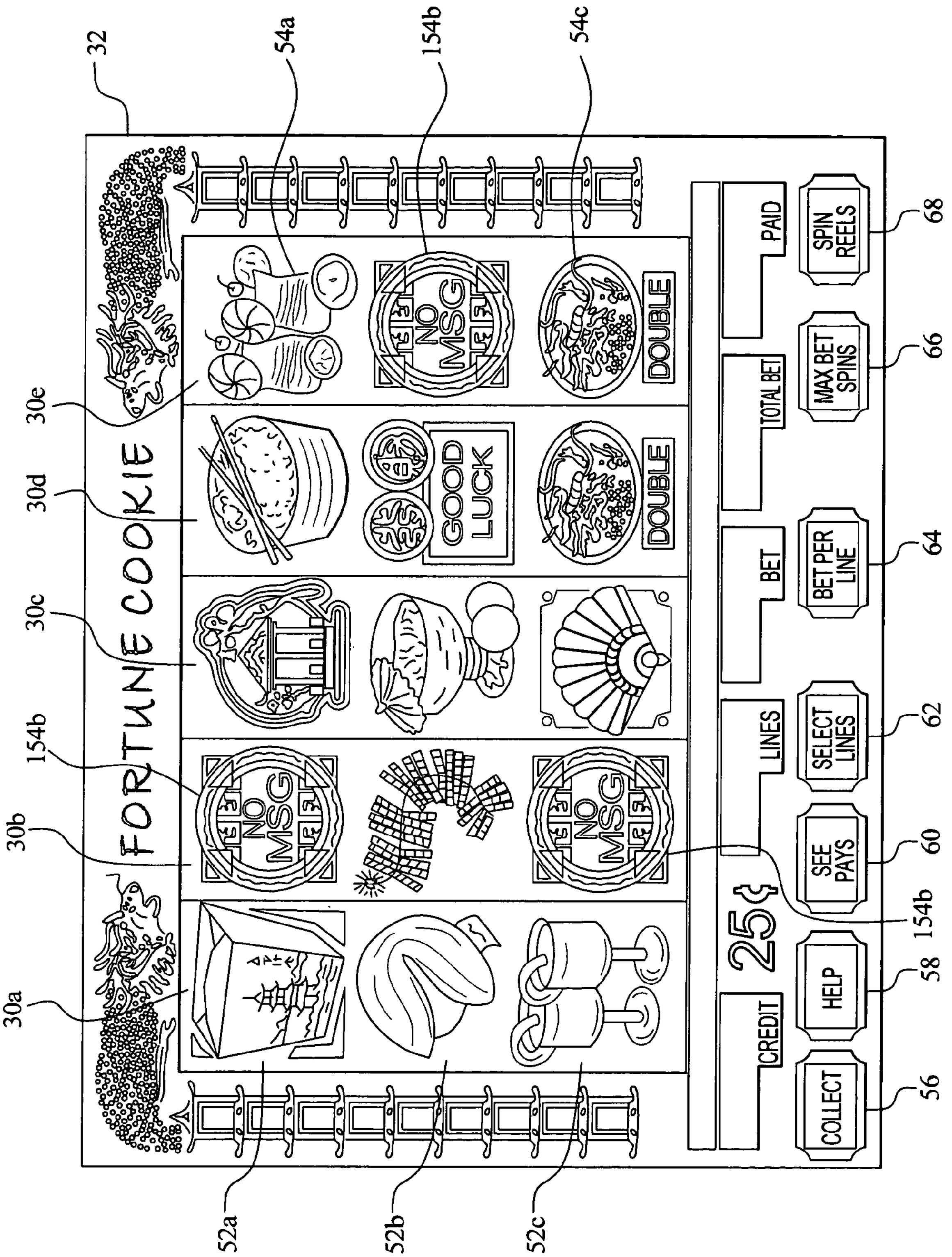
FIG. 5 is a front plan view of another embodiment of the display of the video monitor of the gaming device having selectable or changeable reel stops.

Referring now to FIG. 5, the same enlarged video screen 32 as in FIG. 4 is shown displaying the changed symbol 154*b*. The symbol 154*b* displays the text "NO MSG." The preferred embodiment of the present invention contains a theme, wherein the game displays oriental items including oriental food and gives the player a choice between having "MSG" or "NO MSG." The theme distinguishes the choices that are provided. It should be appreciated that the present invention does not have to provide a theme. The choices can be completely unrelated to each other. For example, the counterpart to the "MSG" symbol 54*b* can be the "DOUBLE DRAGON" symbol 54*c*.

In accordance with the theme of the gaming device, the present invention preferably provides an audio display that accompanies the player's decision to change one of the symbols 54. For example, in the preferred embodiment, the gaming device emits a voice having the characteristics of an oriental man from the speakers 34 when the player changes the "MSG" symbol 54*b* or the "NO MSG" symbol 154*b*. When the player changes the "MSG" symbol, the speakers emit the voice of an oriental man saying the letters, "M-S-G." Likewise, when the player changes the "NO-MSG" symbol 154*b*, the speakers emit the voice saying, "NO-MSG." This provides the player with an entertaining aside from playing the game.

It should be appreciated that the gaming device can provide an audio display before and after the player changes a symbol. For example, the gaming device can, after every spin of the reels, prompt the player with a suitable message such as, "MSG or NO-MSG?". The present invention can provide any suitable sound and is not limited to reciting the text of the symbol.

The invention also contemplates providing a visual display either before, after or contemporaneous with a symbol change. The video display 32 or some other suitable display can produce the visual display, which preferably corresponds with the theme of the gaming device. For example, the present invention can have a separate display of a fictitious blood pressure indicator that fluctuates depending upon whether the player selects "MSG" or "NO-MSG."

Referring now to FIGS. 4 and 5, the present invention preferably includes a touch screen 46 with the video display 32. The touch screen 46 of the video display 32 enables the player to command the game to perform many functions. The collect button 56 enables the player to cash out. The help button 58 enables the player to receive instructions. The "see pays" button 60 enables the player obtain payout information. The "select lines" button 62 enables the player to activate different paylines 52. The "bet per line" button 64 enables the player to modify the player's bet for each payline 52. The "max bet spin" button 66 enables the player to bet the maximum amount and immediately initiate the spin of the reels. The "spin reels" button 68 enables the player to initiate the spin of the reels.

The touch screen 46 of the video display 32 also enables the player to change the symbols 54*b* and 154*b*. Preferably, when the game displays the "MSG" symbol 54*b*, and the player desires the "NO MSG" symbol, the game enables the player to touch the area of the display 32 that contains the symbol 54*b*. The gaming device switches the symbol and provides the associated or accompanying audio and video displays. Likewise, if the player desires to have MSG, the player selects the displayed "NO-MSG" symbol 154*b*, and the gaming device switches the symbol to the "MSG" symbol.

It should be appreciated that the present invention can operate wherein the video monitor 32 does not contain a touch screen 50. This embodiment requires an extra input device 33 (FIG. 2) similar in form and operation to the cash out button 26 or bet one button 24 described in connection with FIG. 1. The input device toggles though the selections and the video monitor displays the various symbols as they are toggled. The separate input embodiment can toggle through any number of symbols 54, however, it should be appreciated that each selection group or pair (e.g., "MSG"/"NO-MSG") requires its own toggling input. For example, the gaming device can enable the player to toggle both "MSG" or "NO-MSG" and "DOUBLE DRAGON" or "SINGLE DRAGON." In this instance, the gaming device supplies two separate toggle switches.

Referring back to FIG. 4, the invention contemplates a symbol change affecting the symbol 54 selected, all like symbols in a reel 30, all like symbols in a payline 52, all like symbols in the video monitor 32, or all like symbols maintained by the gaming device. For example, in one embodiment, when the player selects the "MSG" symbol 54*b* on reel 30*e*, intending to change it to the "NO MSG" symbol 154*b*, the gaming device only changes that symbol. That is, the other "MSG" symbols 54*b* displayed on reel 30*b* are not effected and remain unchanged.

Referring still to FIG. 4, in another embodiment of the present invention, when the player selects either of the "MSG" symbols 54*b* displayed on reel 30*b*, intending to change it to the "NO MSG" symbol 154*b*, the gaming device changes all the "MSG" symbols on that reel. That is, both the "MSG" symbols 54*b* displayed in paylines 52*a* and 52*c* of reel 30*b* are changed regardless of which "MSG" symbol the player selects. The "MSG" symbol 54*b* on reel 30*c*, however, remains unchanged. The present invention can change all the "MSG" symbols 54*b* on the entire reel 30*b*, shown in FIG. 7, or, alternatively, can change only the "MSG" symbols 54*b* displayed in video monitor 32, i.e., the two shown in paylines 52*a* and 52*b*.

Figure 6:
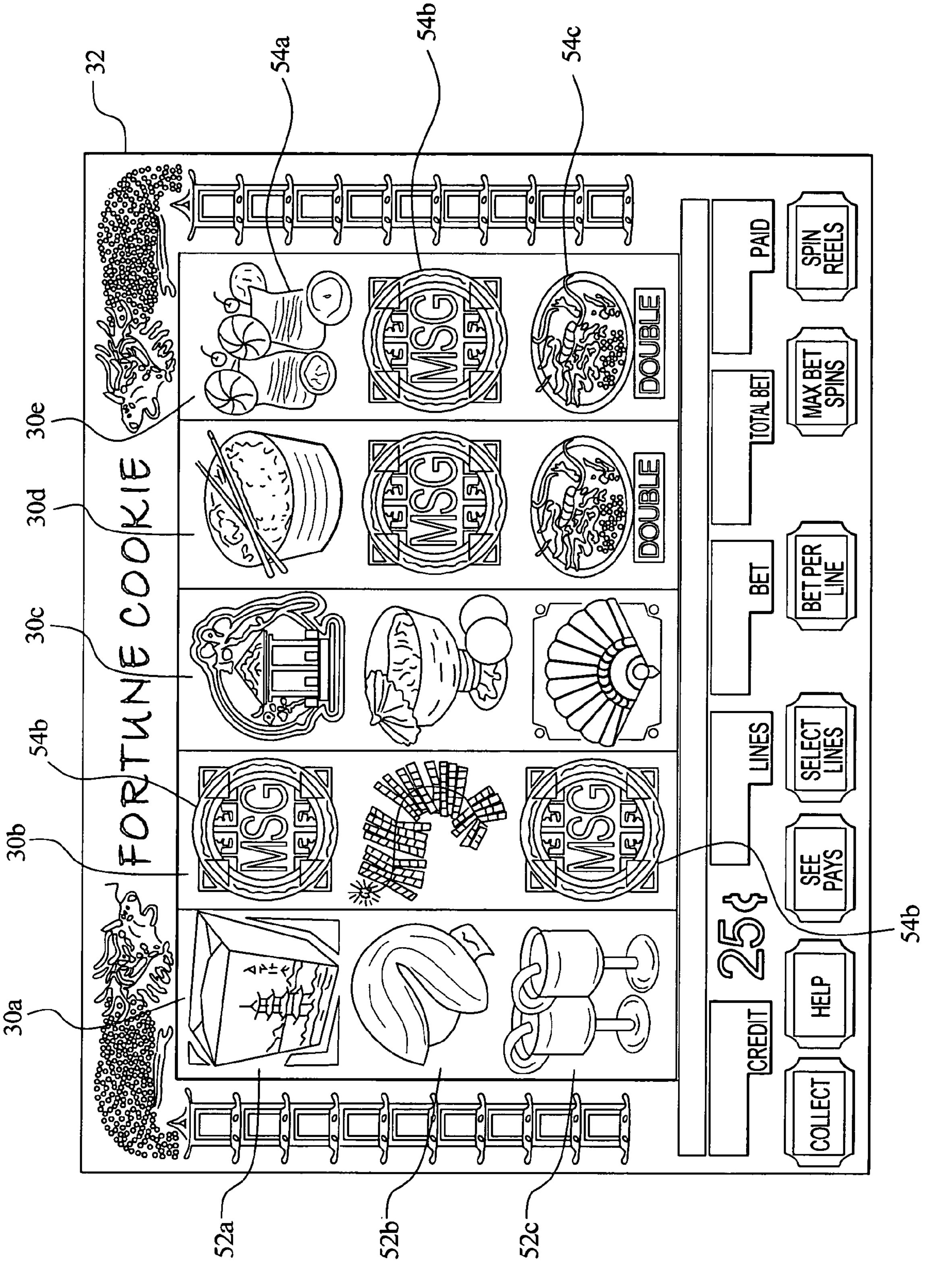
FIG. 6 is a front plan view of a further embodiment of the display of the video monitor of the gaming device having selectable or changeable reel stops.

Referring to FIG. 6, in a further embodiment of the present invention, when the player selects either of the "MSG" symbols 54*b* displayed in payline 52*b*, intending to change it to the "NO MSG" symbol 54*d*, the gaming device changes all the "MSG" symbols in that payline. That is, both the "MSG" symbols 54*b* displayed in reels 30*d* and 30*e* of the payline 52*b* are changed regardless of which "MSG" symbol the player selects. The "MSG" symbols 54*b* on paylines 52*a* and 52*c*, however, remain unchanged.

Referring again to FIG. 4, in a still further embodiment of the present invention, when the player selects any of the "MSG" symbols 54*b* displayed in the video monitor 32, intending to change it to the "NO MSG" symbol 154*b*, the gaming device changes all the "MSG" symbols displayed in the video monitor. That is, all three of the "MSG" symbols 54*b* displayed in reels 30*b* and 30*e* are changed regardless of which "MSG" symbol the player selects. The present invention can change all the "MSG" symbols 54*b* on every stop of the gaming machine, shown in FIG. 7, or, alternatively, can change only the "MSG" symbols 54*b* displayed in video monitor 32, i.e., the three shown in the reels 30*b* and 30*c*.

In the above embodiments wherein the gaming device links the symbols 54*b* or 154*b* (i.e., the linked payline embodiment, the linked reel embodiment, the linked video screen embodiment, and the linked all stops embodiment), the linked changeable symbols can be in-sink such that they all display the "MSG" symbol 54*b* or the "NO MSG" symbol 154*b* at all times. This embodiment is preferred when there are more than two possibilities to choose from for a particular stop that contains a changeable symbol. Alternatively, the present invention can link the changeable symbols so that they all change at one time, but wherein each linked symbol can change to either the "MSG" symbol or the "NO-MSG" symbol.

As briefly described above, the gaming device can enable a player to change any number of symbols in accordance with the gaming device theme and its payout structure. In the examples given above, the present invention contemplates enabling the player to change the "DOUBLE DRAGON" symbol 54*c*, or other suitable symbol, as well as the "MSG" symbol 54*b* and the "NO MSG" symbol 54*b*. In essence, the present invention contains a set of changeable symbols, and the gaming device can assign any symbols of the set to any pay stop on the reels having changeable symbols.

Figure 7:
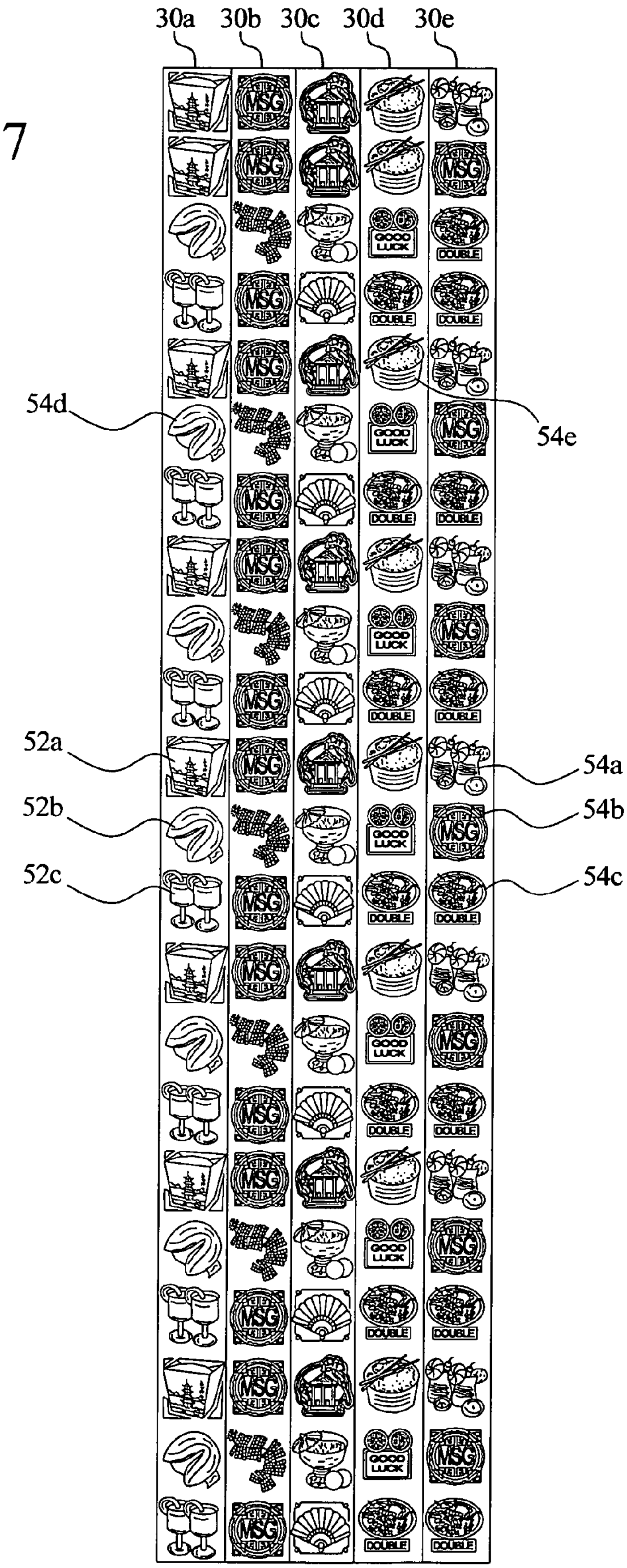
FIG. 7 is a top plan view of five reel strips having a plurality of stops which contain changeable symbols.

Referring to FIG. 7, to illustrate the multiple selection embodiment, the entire twenty-two stop and five reel array of symbols is displayed. The array contains 110 total stops. Each stop could wind up in one of the three paylines 52*a*, 52*b* or 52*c* after the player spins the reels. Each stop is either changeable or not changeable. In the preferred embodiment, each stop having the "MSG" symbol 54*b* is changeable and all others are fixed. In one embodiment, the set of possibilities for each changeable symbol includes the "MSG" symbol, which is displayed, or the "NO-MSG" symbol, which would be displayed if the player selected or pressed the area of the touch screen containing the "MSG" symbol 54*b*.

Alternatively, the present invention can also make the "DOUBLE DRAGON" symbol 54*c* and the "FORTUNE COOKIE" symbol 54*d* changeable, so that the set of changeable symbol includes four possibilities. The present invention can include any number of symbols in the set. It should be appreciated that the changeable symbols could have any indicia and are not limited to the indicia discussed in these examples. The indicia discussed in the examples merely aid in illustrating the present invention. With that understood, the present invention contemplates distributing the symbols or possibilities in a plurality of ways.

In one embodiment, the changeable symbols operate in pairs. For example, the player can toggle back and forth between the "MSG" symbol 54*b* and the "NO-MSG" symbol 154*b* or between the "DOUBLE DRAGON" symbol 54*c* and the "FORTUNE COOKIE" symbol 54*d*. The pairs preferably operate independently of each other, i.e., selecting "MSG" or "NO-MSG" has no effect upon the "DOUBLE DRAGON" or "FORTUNE COOKIE" symbols and vice-versa.

The pairs can alternatively operate dependently, i.e., selecting "MSG" or "NO-MSG" affects the "DOUBLE DRAGON"/"FORTUNE COOKIE" pair. In this alternative, the gaming device links the pairs so that when, for example the "MSG" symbol appears, the "DOUBLE DRAGON" symbol also appears. If the player selects either one, all "MSG" symbols change to "NO-MSG" symbols and all "DOUBLE DRAGON" symbols change to "FORTUNE COOKIE" symbols. Likewise, selecting either of the "NO-MSG" or "FORTUNE COOKIE" symbols changes these symbols to the "MSG" and "DOUBLE DRAGON" symbols, respectively. This example illustrates a changeable symbol pair linking to one other symbol pair. It should be appreciated that a changeable symbol pair can link to a plurality of different symbol pairs.

In another embodiment, any stop having a changeable symbol enables the player to toggle through all four of the selections. In a further embodiment, any stop having a changeable symbol enables the player to toggle through three of the four selections. It should be appreciated that the present invention contemplates any changeable stop having any number of the possibilities, the determination of which the implementor makes based on the gaming device theme and payout structure.

It is well known that gaming devices having a set of reels that display symbols contain combinations of symbols that yield awards or prizes to the player. The present invention contemplates having such combinations and having one or more symbols of those combinations be changeable symbols. The implementor determines the number of changeable symbols that comprise a winning combination based upon a game theme and upon the payout structure.

For example, the present invention contemplates issuing the player 10 credits for obtaining two "MSG" symbols 54*b* or 15 credits for obtaining three "NO-MSG" symbols 154*b*. In this example, the player increases the percentage of obtaining a winning combination by setting all the symbols to display the "MSG" symbols 54*b*. The player plays for "bigger money" by setting all the symbols to display the "NO-MSG" symbol.

In the embodiment wherein the "DOUBLE DRAGON" symbol 54*c* and the "FORTUNE COOKIE" symbol 54*d* are also changeable, the present invention contemplates awarding the player credits for obtaining one of each, i.e. for obtaining an "MSG" symbol, a "NO-MSG" symbol, a "DOUBLE DRAGON" symbol, and a "FORTUNE COOKIE" symbol. In this example, the player maximizes the chances of obtaining this winning combination by setting the changeable stops to have an equal amount of each of the above mentioned symbols.

These examples illustrate that the present invention enables the player to affect the likelihood of obtaining a particular winning combination. The gaming device enables the player to establish personal preferences such as MSG or NO MSG, caffeine or no caffeine, favorite player X or favorite player Y etc., wherein the preferences directly affect the player's success at playing the gaming device. In certain instances, such as changing a symbol to display the logo of a favorite sports team or the name of the player's hometown or city, the selection may vest the player in the outcome of the game. That is, the player desires to win a gaming device award, and the player desires to win the award with the symbols displaying the player's favorite team or city.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is hereby claimed as follows:

1. A gaming device operable under control of a processor, said gaming device comprising:

a game controlled by the processor and operable upon a wager by a player;

a plurality of reels in the game;

a plurality of symbols on the reels, (a) said symbols including a first designated symbol at a designated position on said reels, said first designated symbol selectively displayable as either first indicia or as different second indicia at said designated position on the reels, and (b) said symbols including a second designated symbol at a different designated position on said reels, said second designated symbol selectively displayable as first indicia or as different second indicia at said designated position on the reels, the first designated symbol and the second designated symbol being the same symbol, the first indicia of the first designated symbol being the same as the first indicia of the second designated symbol, wherein each of said designated symbols has a function on the reels in the game for determining any winning outcomes;

an input device operable with the processor to enable the player to select which of the first indicia or the second indicia of the first designated symbol will be displayed at the designated position of said first designated symbol on said reels, wherein:

(a) if the player inputs a selection of the first indicia of the first designated symbol on the reels to be displayed at the designated position of said first designated symbol on said reels, the processor causes:

(i) the first indicia of said first designated symbol to be displayed at said designated position of said first designated symbol on the reels, and (ii) the first indicia of the second designated symbol to be displayed at said designated position of said second designated symbol on the reels, and (b) if the player inputs a selection of the second indicia of the first designated symbol on the reels to be displayed at the designated position of said first designated symbol on said reels, the processor causes:

(i) the second indicia of said first designated symbol to be displayed at said designated position of said first designated symbol on the reels, and (ii) the second indicia of the second designated symbol to be displayed at said designated position of said second designated symbol on the reels; and at least one winning outcome adapted to be provided to the player based on the symbols generated on said reels and said functions of said symbols regardless of which of said indicia is displayed at the designated position of said designated symbol.

2. The gaming device of claim 1, wherein the input device includes a touch screen.

3. The gaming device of claim 1, wherein the first designated symbol and the second designated symbols are on the same reel.

4. The gaming device of claim 1, wherein the first designated symbol and the second designated symbols are on different reels.

5. The gaming device of claim 1, wherein the second indicia of the first designated symbol is the same as the second indicia of the second designated symbol.

6. The gaming device of claim 1, wherein the second indicia of the first designated symbol is different than the second indicia of the second designated symbol.

7. The gaming device of claim 1, wherein the functions of the first designated symbol and the second designated symbol on the reels in the game are the same for determining any winning outcomes based on the symbols generated on the reels.

8. A gaming device operable under control of a processor, said gaming device comprising:

a game controlled by the processor and operable upon a wager by a player;

a plurality of reels in the game;

a plurality of symbols on the reels, said symbols including a plurality of designated symbols each at different designated positions on said reels, each of said designated symbols selectively displayable on the reels as first indicia or as different second indicia at the designated position of said designated symbol on the reels, and each of said designated symbols having a function on the reels in the game for determining any winning outcomes, at least two of the designated symbols being the same symbol, and the first indicia of one of said same designated symbols being the same as the first indicia of another of said same designated symbols;

an input device operable with the processor to enable the player to select which of the first indicia or the second indicia of one of the plurality of designated symbols will be displayed at the designated position of said designated symbol on said reels, wherein if the player inputs a selection the first indicia or the second indicia of the said designated symbol to be displayed at the designated position of said designated symbol on said reels, the processor causes (a) the selected first indicia or the selected second indicia of said designated symbol to be displayed on the reels at said designated position on the reels, and (b) the corresponding first indicia or second indicia for at least one other designated symbol to be displayed on the reels at said designated position of said other designated symbol on the reels; and at least one winning outcome adapted to be provided to the player based on the symbols generated on said reels regardless of which of said indicia is displayed at the designated position of said designated symbol.

9. The gaming device of claim 8, wherein the input device includes a touch screen.

10. The gaming device of claim 8, wherein at least two of said designated symbols are on the same reel.

11. The gaming device of claim 8, wherein at least two of the designated symbols are on different reels.

12. The gaming device of claim 8, wherein the first indicia of each of said same designated symbols are the same and the second indicia of each of said same designated symbols are the same.

13. The gaming device of claim 8, wherein at least two of the designated symbols are different symbols.

14. The gaming device of claim 8, wherein the first indicia of at least two of the designated symbols are different.

15. The gaming device of claim 8, wherein the second indicia of at least two of the same designated symbols are different.

16. The gaming device of claim 8, wherein the functions of a plurality of the designated symbols are the same in the game for determining any winning outcomes based on the symbols generated on the reels.

17. A gaming device operable under control of a processor, said gaming device comprising:

a game controlled by the processor and operable upon a wager by a player;

a plurality of reels in the game;

a plurality of symbols on the reels, said symbols including a plurality of designated symbols at different designated positions on said reels, each of said designated symbols selectively displayable on the reels as one of a plurality of different indicia at the designated position of said designated symbol on the reels, and each of said designated symbols having a function on the reels in the game for determining any winning outcomes, all of the designated symbols being the same symbol, and one of the plurality of different indicia for each of the designated symbols being the same;

an input device operable with the processor to enable the player to select which of the plurality of different indicia of one of the plurality of designated symbols will be displayed at the designated position of said designated symbol on said reels, wherein if the player inputs a selection of one of the plurality of indicia of said designated symbol to be displayed at said designated position of said designated symbol on said reels, the processor causes (a) the selected indicia of said designated symbol to be displayed on the reels at said designated position on the reels, and (b) the corresponding indicia for at least one other designated symbol to be displayed on the reels at said designated position of said other designated symbol on the reels; and at least one winning outcome adapted to be provided to the player based on the symbols generated on said reels and regardless of which of said indicia is displayed at the designated position of said designated symbol.

18. The gaming device of claim 17, wherein the input device includes a touch screen.

19. The gaming device of claim 17, wherein the designated symbols are on the same reel.

20. The gaming device of claim 17, wherein at least two of the designated symbols are on different reels.

21. The gaming device of claim 17, wherein the functions of at least two of the designated symbols are the same in the game for determining any winning outcomes based on the symbols generated on the reels.

22. The gaming device of claim 17, wherein the functions of all of the designated symbols are the same in the game for determining any winning outcomes based on the symbols generated on the reels.

23. A gaming device operable under control of a processor, said gaming device comprising:

a game controlled by the processor and operable upon a wager by a player;

a plurality of reels in the game;

a plurality of symbols on the reels, (a) said symbols including same first and second designated symbols at different designated positions on said reels, each of said first and second designated symbols selectively displayable on the reels as first indicia or as different second indicia at the designated position of said designated symbol on the reels, and (b) said symbols including same third and fourth designated symbols at different designated positions on said reels, each of said third and fourth designated symbols selectively displayable on the reels as third indicia or as different fourth indicia at the designated position of said designated symbol on the reels, wherein each of said designated symbols has a function on the reels in the game for determining any winning outcomes;

at least one input device operable with the processor to enable the player to select which of the first indicia or the second indicia of the first designated symbol will be displayed at the designated position of said first designated symbol on said reels, wherein:

(a) if the player inputs a selection of the first indicia of said first designated symbol on the reels to be displayed at the designated position of said first designated symbol on said reels, the processor causes:

(i) the first indicia of said first designated symbol to be displayed at said designated position of said first designated symbol on the reels, (ii) the first indicia of said second designated symbol to be displayed on the reels at said designated position of said second designated symbol on the reels, (iii) the third indicia of the third designated symbols to be displayed at the designated position of the third designated symbol on the reels, and (iv) the third indicia of said fourth designated symbol to be displayed on the reels at said designated position of said fourth designated symbol on the reels, and (b) if the player inputs a selection of the second indicia of said first designated symbol on the reels to be displayed at the designated position of said first designated symbol on said reels, the processor causes:

(i) the second indicia of said first designated symbol to be displayed at said designated position of said first designated symbol on the reels, (ii) the second indicia of the second designated symbol to be displayed on the reels at said designated position of said second designated symbol on the reels, (iii) the fourth indicia of said third designated symbol to be displayed at the designated position of said third designated symbol on the reels, and (iv) the fourth indicia of said fourth designated symbols to be displayed on the reels at said designated position of said fourth designated symbol on the reels; and at least one winning outcome adapted to be provided to the player based on the symbols generated on said reels regardless of which of said indicia is displayed at the designated position of each said designated symbol.

24. The gaming device of claim 23, wherein the input device includes a touch screen.

25. The gaming device of claim 23, wherein the first and second designated symbols are on the same reel.

26. The gaming device of claim 23, wherein the third and fourth designated symbols are on the same reel.

27. The gaming device of claim 23, wherein at least one of the first and second designated symbols and at least one of the third and fourth designated symbols are on different reels.

28. The gaming device of claim 23, wherein the functions of the first and second designated symbols and the third and fourth designated symbols are different in the game for determining any winning outcomes based on the symbols generated on the reels.

29. A gaming device operable under control of a processor, said gaming device comprising:

a game controlled by the processor and operable upon a wager by a player;

a plurality of reels in the game;

a plurality of symbols on the reels, (a) said symbols including a first designated symbol at a designated position on said reels, said first designated symbol selectively displayable as first indicia or as different second indicia at said designated position on the reels, and (b) said symbols including a second designated symbol at a different designated position on said reels, said second designated symbol selectively displayable as first indicia or as different second indicia at said designated position on the reels, the first designated symbol and the second designated symbols being the same symbol, the first indicia of the first designated symbol being the same as the first indicia of the second designated symbol, wherein each of said designated symbols has a function on the reels in the game for determining any winning outcomes;

means for causing a selection of the display of first indicia or the second indicia for the first designated symbol at the first designated position on said reels, wherein:

(a) if the selection is of the first indicia of the first designated symbol on the reels to be displayed at the designated position of said first designated symbol on said reels, the processor causes:

(i) the first indicia of said first designated symbol to be displayed at said designated position of said first designated symbol on the reels, and (ii) the first indicia of the second designated symbol to be displayed at said designated position of said second designated symbol on the reels, and (b) if the selection is of the second indicia of the first designated symbol on the reels to be displayed at the designated position of said first designated symbol on said reels, the processor causes:

(i) the second indicia of said first designated symbol to be displayed at said designated position of said first designated symbol on the reels, and (ii) the second indicia of the second designated symbol to be displayed at said designated position of said second designated symbol on the reels; and at least one winning outcome adapted to be provided to the player based on the symbols generated on said reels and said functions of said symbols regardless of which of said indicia is displayed at the designated position of said designated symbol.

30. The gaming device of claim 29, wherein the selection causing means causes a random selection.

31. The gaming device of claim 29, wherein the first designated symbol and the second designated symbols are on the same reel.

32. The gaming device of claim 29, wherein the first designated symbol and the second designated symbols are on different reels.

33. The gaming device of claim 29, wherein the second indicia of the first designated symbol is the same as the second indicia of the second designated symbol.

34. The gaming device of claim 29, wherein and the second indicia of the first designated symbol is different than the second indicia of the second designated symbol.

35. The gaming device of claim 29, wherein the functions of the first designated symbol and the second designated symbol on the reels in the game are the same for determining any winning outcomes based on the symbols generated on the reels.

36. A gaming device operable under control of a processor, said gaming device comprising:

a game controlled by the processor and operable upon a wager by a player;

a plurality of reels in the game;

a plurality of symbols on the reels, said symbols including a plurality of designated symbols each at different designated positions on said reels, each of said designated symbols selectively displayable on the reels as first indicia or as different second indicia at the designated position of said designated symbol on the reels, and each of said designated symbols having a function on the reels in the game for determining any winning outcomes, at least two of the designated symbols being the same symbol, the first indicia of one of said same designated symbols being the same as the first indicia of another of said same designated symbols;

means for causing a selection of the first indicia or the second indicia of one of the plurality of designated symbols to be displayed at the designated position of said designated symbol on said reels, wherein if the selection is of the first indicia or the second indicia of the said designated symbol to be displayed at the designated position of said designated symbol on said reels, the processor causes (a) the selected first indicia or the selected second indicia of said designated symbol to be displayed on the reels at said designated position on the reels, and (b) the corresponding first indicia or second indicia for at least one other designated symbol to be displayed on the reels at said designated position of said other designated symbol on the reels; and at least one winning outcome adapted to be provided to the player based on the symbols generated on said reels regardless of which of said indicia is displayed at the designated position of said designated symbol.

37. The gaming device of claim 36, wherein the selection causing means causes a random selection.

38. The gaming device of claim 36, wherein at least two of said designated symbols are on the same reel.

39. The gaming device of claim 36, wherein at least two of the designated symbols are on different reels.

40. The gaming device of claim 36, wherein the first indicia of each of said same designated symbols are the same and the second indicia of each of said same designated symbols are the same.

41. The gaming device of claim 36, wherein at least two of the designated symbols are different symbols.

42. The gaming device of claim 36, wherein the first indicia of at least two of the designated symbols are different.

43. The gaming device of claim 36, wherein the second indicia of at least two of the designated symbols are different.

44. The gaming device of claim 36, wherein the functions of a plurality of the designated symbols are the same in the game for determining any winning outcomes based on the symbols generated on the reels.

45. A gaming device operable under control of a processor, said gaming device comprising:

a game controlled by the processor and operable upon a wager by a player;

a plurality of reels in the game;

a plurality of symbols on the reels, said symbols including a plurality of designated symbols at different designated positions on said reels, each of said designated symbols selectively displayable on the reels as one of a plurality of different indicia at the designated position of said designated symbol on the reels, and each of said designated symbols having a function on the reels in the game for determining any winning outcomes, all of the designated symbols being the same symbol, and one of the plurality of different indicia for each of the designated symbols being the same;

means for causing a selection of one of the plurality of different indicia of one of the plurality of designated symbols to be displayed at the designated position of said designated symbol on said reels, wherein after the selection of one of the plurality of indicia of said designated symbol to be displayed at said designated position of said designated symbol on said reels, the processor causes (a) the selected indicia of said designated symbol to be displayed on the reels at said designated position on the reels, and (b) the corresponding indicia for at least one other designated symbol to be displayed on the reels at said designated position of said other designated symbol on the reels; and at least one winning outcome adapted to be provided to the player based on the symbols generated on said reels and regardless of which of said indicia is displayed at the designated position of said designated symbol.

46. The gaming device of claim 45, wherein the selection causing means causes a random selection.

47. The gaming device of claim 45, wherein the designated symbols are on the same reel.

48. The gaming device of claim 45, wherein at least two of the designated symbols are on different reels.

49. The gaming device of claim 45, wherein the functions of at least two of the designated symbols are the same in the game for determining any winning outcomes based on the symbols generated on the reels.

50. The gaming device of claim 45, wherein the functions of all of the designated symbols are the same in the game for determining any winning outcomes based on the symbols generated on the reels.

51. A gaming device operable under control of a processor, said gaming device comprising:

a game controlled by the processor and operable upon a wager by a player;

a plurality of reels in the game;

a plurality of symbols on the reels, (a) said symbols including same first and second designated symbols at different designated positions on said reels, each of said first and second designated symbols selectively displayable on the reels as first indicia or as different second indicia at the designated position of said designated symbol on the reels, and (b) said symbols including same third and fourth designated symbols at different designated positions on said reels, each of said third and fourth designated symbols selectively displayable on the reels as third indicia or as different fourth indicia at the designated position of said designated symbol on the reels, wherein each of said designated symbols has a function on the reels in the game for determining any winning outcomes;

means for causing a selection of the first indicia or the second indicia of the first designated symbol to be displayed at the designated position of said first designated symbol on said reels, wherein:

(a) if the selection is of the first indicia of said first designated symbol on the reels to be displayed at the designated position of said first designated symbol on said reels, the processor causes:

(i) the first indicia of said first designated symbol to be displayed at said designated position of said first designated symbol on the reels, (ii) the first indicia of said second designated symbol to be displayed on the reels at said designated position of said second designated symbol on the reels, (iii) the third indicia of the third designated symbols to be displayed at the designated position of the third designated symbol on the reels, and (iv) the third indicia of said fourth designated symbol to be displayed on the reels at said designated position of said fourth designated symbol on the reels, and (b) if the selection is of the second indicia of said first designated symbol on the reels to be displayed at the designated position of said first designated symbol on said reels, the processor causes:

(i) the second indicia of said first designated symbol to be displayed at said designated position of said first designated symbol on the reels, (ii) the second indicia of the second designated symbol to be displayed on the reels at said designated position of said second designated symbol on the reels, (iii) the fourth indicia of said third designated symbol to be displayed at the designated position of said third designated symbol on the reels, and (iv) the fourth indicia of said fourth designated symbols to be displayed on the reels at said designated position of said fourth designated symbol on the reels; and at least one winning outcome adapted to be provided to the player based on the symbols generated on said reels regardless of which of said indicia is displayed at the designated position of each said designated symbol.

52. The gaming device of claim 51, wherein the selection causing means causes a random selection.

53. The gaming device of claim 51, wherein the first and second designated symbols are on the same reel.

54. The gaming device of claim 51, wherein the third and fourth designated symbols are on the same reel.

55. The gaming device of claim 51, wherein at least one of the first and second designated symbols and at least one of the third and fourth designated symbols are on different reels.

56. The gaming device of claim 51, wherein the functions of the first and second designated symbols and the third and fourth designated symbols are different in the game for determining any winning outcomes based on the symbols generated on the reels.

57. A gaming system comprising:

a gaming device including at least one display device and at least one input device; and a server remote from the gaming device and configured to communicate with said gaming device, said server and said gaming device configured to:

(i) after a player makes a first wager at a first time using said at least one input device, (a) cause a first random generation of a first plurality of symbols from a first set of symbols, said first set of symbols including a plurality of different symbols, (b) cause said display device to display said generated first plurality of symbols, and (c) cause any awards associated with any first winning symbol or symbol combinations of said generated first plurality of symbols to be provided to the player, (ii) after the player makes an input to change said symbols at a second subsequent time using said at least one input device:

(d) cause a change on the at least one display from the first set of symbols to a second set of symbols, said second set of symbols being different than the first set of symbols, all of the second symbols in said second set of symbols being different than the first symbols in said first set of symbols, (iii) after the player makes a second wager using said at least one input device, (e) cause a second random generation of a second plurality of symbols from the second set of symbols which are not in the first set of symbols, (f) cause said display device to display said generated second plurality of symbols, and (g) cause any awards associated with any second winning symbols or second winning symbol combinations of said generated second plurality of symbols to be provided to the player, and such that the server at least in part causes (d).

58. The gaming system of claim 57, wherein said first set of symbols are on a plurality of first reels.

59. The gaming system of claim 58, wherein the said second set of symbols are on a plurality of second reels.

60. The gaming system of claim 57, wherein the said second set of symbols are on a plurality of second reels.

61. The gaming system of claim 57, wherein the server and said gaming device are configured to: cause said plurality of generated first symbols and the plurality of generated second symbols to be displayed in the same positions by the display device.

62. The gaming system of claim 57, wherein first winning symbols and first winning symbol combinations and the second winning symbols and second winning symbol combinations are evaluated based on a same paytable.

63. The gaming system of claim 57, wherein first winning symbols and first winning symbol combinations and the second winning symbols and second winning symbol combinations are evaluated based on different paytables.

64. The gaming system of claim 57, wherein the server at least in part causes at least one of (a), (b), (e), and (f).

65. A gaming device operable under control of a processor, said gaming device comprising:

a game controlled by the processor and operable upon a wager by a player;

a plurality of reels in the game;

a plurality of symbols on the reels, (a) said symbols including a first designated symbol at a designated position on said reels, said first designated symbol selectively displayable as either first indicia or as different second indicia at said designated position on the reels, and (b) said symbols including a second designated symbol at a different designated position on said reels, said second designated symbol selectively displayable as first indicia or as different second indicia at said designated position on the reels, the first indicia of the first designated symbol being different than the first indicia of the second designated symbol, wherein each of said designated symbols has a function on the reels in the game for determining any winning outcomes;

an input device operable with the processor to enable the player to select which of the first indicia or the second indicia of the first designated symbol will be displayed at the designated position of said first designated symbol on said reels, wherein:

(a) if the player inputs a selection of the first indicia of the first designated symbol on the reels to be displayed at the designated position of said first designated symbol on said reels, the processor causes:

(i) the first indicia of said first designated symbol to be displayed at said designated position of said first designated symbol on the reels, and (ii) the first indicia of the second designated symbol to be displayed at said designated position of said second designated symbol on the reels, and (b) if the player inputs a selection of the second indicia of the first designated symbol on the reels to be displayed at the designated position of said first designated symbol on said reels, the processor causes:

(i) the second indicia of said first designated symbol to be displayed at said designated position of said first designated symbol on the reels, and (ii) the second indicia of the second designated symbol to be displayed at said designated position of said second designated symbol on the reels; and at least one winning outcome adapted to be provided to the player based on the symbols generated on said reels and said functions of said symbols regardless of which of said indicia is displayed at the designated position of said designated symbol.

66. The gaming device of claim 65, wherein the input device includes a touch screen.

67. The gaming device of claim 65, wherein the second indicia of the first designated symbol is different than the second indicia of the second designated symbol.

68. The gaming device of claim 65, wherein the functions of the first designated symbol and the second designated symbol on the reels in the game are the same for determining any winning outcomes based on the symbols generated on the reels.

69. A gaming device operable under control of a processor, said gaming device comprising:

a game controlled by the processor and operable upon a wager by a player;

a plurality of reels in the game;

a plurality of symbols on the reels, (a) said symbols including a first designated symbol at a designated position on said reels, said first designated symbol selectively displayable as either first indicia or as different second indicia at said designated position on the reels, and (b) said symbols including a second designated symbol at a different designated position on said reels, said second designated symbol selectively displayable as first indicia or as different second indicia at said designated position on the reels, the first designated symbol and the second designated symbol being different symbols, and the first indicia of the first designated symbol being different than the first indicia of the second designated symbol, wherein each of said designated symbols has a function on the reels in the game for determining any winning outcomes;

an input device operable with the processor to enable the player to select which of the first indicia or the second indicia of the first designated symbol will be displayed at the designated position of said first designated symbol on said reels, wherein:

(a) if the player inputs a selection of the first indicia of the first designated symbol on the reels to be displayed at the designated position of said first designated symbol on said reels, the processor causes:

(i) the first indicia of said first designated symbol to be displayed at said designated position of said first designated symbol on the reels, and (ii) the first indicia of the second designated symbol to be displayed at said designated position of said second designated symbol on the reels, and (b) if the player inputs a selection of the second indicia of the first designated symbol on the reels to be displayed at the designated position of said first designated symbol on said reels, the processor causes:

(i) the second indicia of said first designated symbol to be displayed at said designated position of said first designated symbol on the reels, and (ii) the second indicia of the second designated symbol to be displayed at said designated position of said second designated symbol on the reels; and at least one winning outcome adapted to be provided to the player based on the symbols generated on said reels and said functions of said symbols regardless of which of said indicia is displayed at the designated position of said designated symbol.

70. The gaming device of claim 69, wherein the input device includes a touch screen.

71. The gaming device of claim 69, wherein the functions of the first designated symbol and the second designated symbol on the reels in the game are the same for determining any winning outcomes based on the symbols generated on the reels.

72. A gaming device operable under control of a processor, said gaming device comprising:

a game controlled by the processor and operable upon a wager by a player;

a plurality of reels in the game;

a plurality of symbols on the reels, (a) said symbols including a first designated symbol at a designated position on said reels, said first designated symbol selectively displayable as either first indicia or as different second indicia at said designated position on the reels, and (b) said symbols including a second designated symbol at a different designated position on said reels, said second designated symbol selectively displayable as first indicia or as different second indicia at said designated position on the reels, wherein each of said designated symbols has a function on the reels in the game for determining any winning outcomes, the functions of the first designated symbol and the second designated symbol on the reels in the game being the same for determining any winning outcomes based on the symbols generated on the reels, an input device operable with the processor to enable the player to select which of the first indicia or the second indicia of the first designated symbol will be displayed at the designated position of said first designated symbol on said reels, wherein:

(a) if the player inputs a selection of the first indicia of the first designated symbol on the reels to be displayed at the designated position of said first designated symbol on said reels, the processor causes:

(i) the first indicia of said first designated symbol to be displayed at said designated position of said first designated symbol on the reels, and (ii) the first indicia of the second designated symbol to be displayed at said designated position of said second designated symbol on the reels, and (b) if the player inputs a selection of the second indicia of the first designated symbol on the reels to be displayed at the designated position of said first designated symbol on said reels, the processor causes:

(i) the second indicia of said first designated symbol to be displayed at said designated position of said first designated symbol on the reels, and (ii) the second indicia of the second designated symbol to be displayed at said designated position of said second designated symbol on the reels; and at least one winning outcome adapted to be provided to the player based on the symbols generated on said reels and said functions of said symbols regardless of which of said indicia is displayed at the designated position of said designated symbol.

73. The gaming device of claim 72, wherein the input device includes a touch screen.

74. The gaming device of claim 72, wherein the first designated symbol and the second designated symbol are the same symbol.

75. The gaming device of claim 72, wherein the first indicia of the first designated symbol is the same as the first indicia of the second designated symbol, and the second indicia of the first designated symbol is the same as the second indicia of the second designated symbol.

76. The gaming device of claim 72, wherein the first designated symbol and the second designated symbol are different symbols.

77. The gaming device of claim 72, wherein the first designated symbol and the second designated symbol are the same symbol, the first indicia of the first designated symbol is the same as the first indicia of the second designated symbol, and the second indicia of the first designated symbol is different than the second indicia of the second designated symbol.

78. A gaming device operable under control of a processor, said gaming device comprising:

a game controlled by the processor and operable upon a wager by a player;

a plurality of reels in the game;

a plurality of symbols on the reels, said symbols including a plurality of designated symbols each at different designated positions on said reels, each of said designated symbols selectively displayable on the reels as first indicia or as different second indicia at the designated position of said designated symbol on the reels, the first indicia of at least two of same designated symbols being different, and each of said designated symbols having a function on the reels in the game for determining any winning outcomes;

an input device operable with the processor to enable the player to select which of the first indicia or the second indicia of one of the plurality of designated symbols will be displayed at the designated position of said designated symbol on said reels, wherein if the player inputs a selection the first indicia or the second indicia of the said designated symbol to be displayed at the designated position of said designated symbol on said reels, the processor causes (a) the selected first indicia or the selected second indicia of said designated symbol to be displayed on the reels at said designated position on the reels, and (b) the corresponding first indicia or second indicia for at least one other designated symbol to be displayed on the reels at said designated position of said other designated symbol on the reels; and at least one winning outcome adapted to be provided to the player based on the symbols generated on said reels regardless of which of said indicia is displayed at the designated position of said designated symbol.

79. The gaming device of claim 78, wherein the input device includes a touch screen.

80. The gaming device of claim 78, wherein the functions of a plurality of the designated symbols are the same in the game for determining any winning outcomes based on the symbols generated on the reels.

81. A gaming device operable under control of a processor, said gaming device comprising:

a game controlled by the processor and operable upon a wager by a player;

a plurality of reels in the game;

a plurality of symbols on the reels, said symbols including a plurality of designated symbols each at different designated positions on said reels, each of said designated symbols selectively displayable on the reels as first indicia or as different second indicia at the designated position of said designated symbol on the reels, the first indicia of at least two of the designated symbols being different, and each of said designated symbols having a function on the reels in the game for determining any winning outcomes;

an input device operable with the processor to enable the player to select which of the first indicia or the second indicia of one of the plurality of designated symbols will be displayed at the designated position of said designated symbol on said reels, wherein if the player inputs a selection the first indicia or the second indicia of the said designated symbol to be displayed at the designated position of said designated symbol on said reels, the processor causes a) the selected first indicia or the selected second indicia of said designated symbol to be displayed on the reels at said designated position on the reels, and (b) the corresponding first indicia or second indicia for at least one other designated symbol to be displayed on the reels at said designated position of said other designated symbol on the reels; and at least one winning outcome adapted to be provided to the player based on the symbols generated on said reels regardless of which of said indicia is displayed at the designated position of said designated symbol.

82. The gaming device of claim 81, wherein the input device includes a touch screen.

83. The gaming device of claim 81, wherein the functions of a plurality of the designated symbols are the same in the game for determining any winning outcomes based on the symbols generated on the reels.

84. A gaming device operable under control of a processor, said gaming device comprising:

a game controlled by the processor and operable upon a wager by a player;

a plurality of reels in the game;

a plurality of symbols on the reels, said symbols including a plurality of designated symbols each at different designated positions on said reels, each of said designated symbols selectively displayable on the reels as first indicia or as different second indicia at the designated position of said designated symbol on the reels, and each of said designated symbols having a function on the reels in the game for determining any winning outcomes, the functions of a plurality of the designated symbols being the same in the game for determining any winning outcomes based on the symbols generated on the reels;

an input device operable with the processor to enable the player to select which of the first indicia or the second indicia of one of the plurality of designated symbols will be displayed at the designated position of said designated symbol on said reels, wherein if the player inputs a selection the first indicia or the second indicia of the said designated symbol to be displayed at the designated position of said designated symbol on said reels, the processor causes (a) the selected first indicia or the selected second indicia of said designated symbol to be displayed on the reels at said designated position on the reels, and (b) the corresponding first indicia or second indicia for at least one other designated symbol to be displayed on the reels at said designated position of said other designated symbol on the reels; and at least one winning outcome adapted to be provided to the player based on the symbols generated on said reels regardless of which of said indicia is displayed at the designated position of said designated symbol.

85. The gaming device of claim 84, wherein the input device includes a touch screen.

86. The gaming device of claim 84, wherein at least two of the designated symbols are the same symbol.

87. The gaming device of claim 84, wherein at least two of the designated symbols are different symbols.

88. A gaming device operable under control of a processor, said gaming device comprising:

a game controlled by the processor and operable upon a wager by a player;

a plurality of reels in the game;

a plurality of symbols on the reels, said symbols including a plurality of designated symbols at different designated positions on said reels, each of said designated symbols selectively displayable on the reels as one of a plurality of different indicia at the designated position of said designated symbol on the reels, and each of said designated symbols having a function on the reels in the game for determining any winning outcomes, the functions of at least two of the designated symbols being the same in the game for determining any winning outcomes based on the symbols generated on the reels;

an input device operable with the processor to enable the player to select which of the plurality of different indicia of one of the plurality of designated symbols will be displayed at the designated position of said designated symbol on said reels, wherein if the player inputs a selection of one of the plurality of indicia of said designated symbol to be displayed at said designated position of said designated symbol on said reels, the processor causes (a) the selected indicia of said designated symbol to be displayed on the reels at said designated position on the reels, and (b) the corresponding indicia for at least one other designated symbol to be displayed on the reels at said designated position of said other designated symbol on the reels; and at least one winning outcome adapted to be provided to the player based on the symbols generated on said reels and regardless of which of said indicia is displayed at the designated position of said designated symbol.

89. The gaming device of claim 88, wherein the input device includes a touch screen.

90. The gaming device of claim 88, wherein at least two of the designated symbols are the same symbol.

91. The gaming device of claim 88, wherein all of the designated symbols are the same symbol.

92. The gaming device of claim 88, wherein the functions of all of the designated symbols are the same in the game for determining any winning outcomes based on the symbols generated on the reels.

93. A gaming device operable under control of a processor, said gaming device comprising:

a game controlled by the processor and operable upon a wager by a player;

a plurality of reels in the game;

a plurality of symbols on the reels, (a) said symbols including a first designated symbol at a designated position on said reels, said first designated symbol selectively displayable as first indicia or as different second indicia at said designated position on the reels, and (b) said symbols including a second designated symbol at a different designated position on said reels, said second designated symbol selectively displayable as first indicia or as different second indicia at said designated position on the reels, the first indicia of the first designated symbol being different than the first indicia of the second designated symbol, wherein each of said designated symbols has a function on the reels in the game for determining any winning outcomes;

means for causing a selection of the display of first indicia or the second indicia for the first designated symbol at the first designated position on said reels, wherein:

(a) if the selection is of the first indicia of the first designated symbol on the reels to be displayed at the designated position of said first designated symbol on said reels, the processor causes:

(i) the first indicia of said first designated symbol to be displayed at said designated position of said first designated symbol on the reels, and (ii) the first indicia of the second designated symbol to be displayed at said designated position of said second designated symbol on the reels, and (b) if the selection is of the second indicia of the first designated symbol on the reels to be displayed at the designated position of said first designated symbol on said reels, the processor causes:

(i) the second indicia of said first designated symbol to be displayed at said designated position of said first designated symbol on the reels, and (ii) the second indicia of the second designated symbol to be displayed at said designated position of said second designated symbol on the reels; and at least one winning outcome adapted to be provided to the player based on the symbols generated on said reels and said functions of said symbols regardless of which of said indicia is displayed at the designated position of said designated symbol.

94. The gaming device of claim 93, wherein the selection causing means causes a random selection.

95. The gaming device of claim 93, wherein the functions of the first designated symbol and the second designated symbol on the reels in the game are the same for determining any winning outcomes based on the symbols generated on the reels.

96. A gaming device operable under control of a processor, said gaming device comprising:

a game controlled by the processor and operable upon a wager by a player;

a plurality of reels in the game;

a plurality of symbols on the reels, (a) said symbols including a first designated symbol at a designated position on said reels, said first designated symbol selectively displayable as first indicia or as different second indicia at said designated position on the reels, and (b) said symbols including a second designated symbol at a different designated position on said reels, said second designated symbol selectively displayable as first indicia or as different second indicia at said designated position on the reels, the first designated symbol and the second designated symbol being different symbols, wherein each of said designated symbols has a function on the reels in the game for determining any winning outcomes;

means for causing a selection of the display of first indicia or the second indicia for the first designated symbol at the first designated position on said reels, wherein:

(a) if the selection is of the first indicia of the first designated symbol on the reels to be displayed at the designated position of said first designated symbol on said reels, the processor causes:

(i) the first indicia of said first designated symbol to be displayed at said designated position of said first designated symbol on the reels, and (ii) the first indicia of the second designated symbol to be displayed at said designated position of said second designated symbol on the reels, and (b) if the selection is of the second indicia of the first designated symbol on the reels to be displayed at the designated position of said first designated symbol on said reels, the processor causes:

(i) the second indicia of said first designated symbol to be displayed at said designated position of said first designated symbol on the reels, and (ii) the second indicia of the second designated symbol to be displayed at said designated position of said second designated symbol on the reels; and at least one winning outcome adapted to be provided to the player based on the symbols generated on said reels and said functions of said symbols regardless of which of said indicia is displayed at the designated position of said designated symbol.

97. The gaming device of claim 96, wherein the selection causing means causes a random selection.

98. The gaming device of claim 96, wherein the first indicia of the first designated symbol is different than the first indicia of the second designated symbol.

99. The gaming device of claim 96, wherein the functions of the first designated symbol and the second designated symbol on the reels in the game are the same for determining any winning outcomes based on the symbols generated on the reels.

100. A gaming device operable under control of a processor, said gaming device comprising:

a game controlled by the processor and operable upon a wager by a player;

a plurality of reels in the game;

a plurality of symbols on the reels, (a) said symbols including a first designated symbol at a designated position on said reels, said first designated symbol selectively displayable as first indicia or as different second indicia at said designated position on the reels, and (b) said symbols including a second designated symbol at a different designated position on said reels, said second designated symbol selectively displayable as first indicia or as different second indicia at said designated position on the reels, wherein each of said designated symbols has a function on the reels in the game for determining any winning outcomes, and the functions of the first designated symbol and the second designated symbol on the reels in the game are the same for determining any winning outcomes based on the symbols generated on the reels, means for causing a selection of the display of first indicia or the second indicia for the first designated symbol at the first designated position on said reels, wherein:

(a) if the selection is of the first indicia of the first designated symbol on the reels to be displayed at the designated position of said first designated symbol on said reels, the processor causes:

(i) the first indicia of said first designated symbol to be displayed at said designated position of said first designated symbol on the reels, and (ii) the first indicia of the second designated symbol to be displayed at said designated position of said second designated symbol on the reels, and (b) if the selection is of the second indicia of the first designated symbol on the reels to be displayed at the designated position of said first designated symbol on said reels, the processor causes:

(i) the second indicia of said first designated symbol to be displayed at said designated position of said first designated symbol on the reels, and (ii) the second indicia of the second designated symbol to be displayed at said designated position of said second designated symbol on the reels; and at least one winning outcome adapted to be provided to the player based on the symbols generated on said reels and said functions of said symbols regardless of which of said indicia is displayed at the designated position of said designated symbol.

101. The gaming device of claim 100, wherein the selection causing means causes a random selection.

102. A gaming device operable under control of a processor, said gaming device comprising:

a game controlled by the processor and operable upon a wager by a player;

a plurality of reels in the game;

a plurality of symbols on the reels, said symbols including a plurality of designated symbols each at different designated positions on said reels, each of said designated symbols selectively displayable on the reels as first indicia or as different second indicia at the designated position of said designated symbol on the reels, the first indicia of at least two same designated symbols being different, and each of said designated symbols having a function on the reels in the game for determining any winning outcomes;

means for causing a selection of the first indicia or the second indicia of one of the plurality of designated symbols to be displayed at the designated position of said designated symbol on said reels, wherein if the selection is of the first indicia or the second indicia of the said designated symbol to be displayed at the designated position of said designated symbol on said reels, the processor causes (a) the selected first indicia or the selected second indicia of said designated symbol to be displayed on the reels at said designated position on the reels, and (b) the corresponding first indicia or second indicia for at least one other designated symbol to be displayed on the reels at said designated position of said other designated symbol on the reels; and at least one winning outcome adapted to be provided to the player based on the symbols generated on said reels regardless of which of said indicia is displayed at the designated position of said designated symbol.

103. The gaming device of claim 102, wherein the selection causing means causes a random selection.

104. The gaming device of claim 102, wherein at least two of the designated symbols are different symbols.

105. The gaming device of claim 102, wherein the functions of a plurality of the designated symbols are the same in the game for determining any winning outcomes based on the symbols generated on the reels.

106. A gaming device operable under control of a processor, said gaming device comprising:

a game controlled by the processor and operable upon a wager by a player;

a plurality of reels in the game;

a plurality of symbols on the reels, said symbols including a plurality of designated symbols each at different designated positions on said reels, each of said designated symbols selectively displayable on the reels as first indicia or as different second indicia at the designated position of said designated symbol on the reels, the first indicia of at least two designated symbols being different, and each of said designated symbols having a function on the reels in the game for determining any winning outcomes;

means for causing a selection of the first indicia or the second indicia of one of the plurality of designated symbols to be displayed at the designated position of said designated symbol on said reels, wherein if the selection is of the first indicia or the second indicia of the said designated symbol to be displayed at the designated position of said designated symbol on said reels, the processor causes (a) the selected first indicia or the selected second indicia of said designated symbol to be displayed on the reels at said designated position on the reels, and (b) the corresponding first indicia or second indicia for at least one other designated symbol to be displayed on the reels at said designated position of said other designated symbol on the reels; and at least one winning outcome adapted to be provided to the player based on the symbols generated on said reels regardless of which of said indicia is displayed at the designated position of said designated symbol.

107. The gaming device of claim 106, wherein the selection causing means causes a random selection.

108. The gaming device of claim 106, wherein the functions of a plurality of the designated symbols are the same in the game for determining any winning outcomes based on the symbols generated on the reels.

109. A gaming device operable under control of a processor, said gaming device comprising:

a game controlled by the processor and operable upon a wager by a player;

a plurality of reels in the game;

a plurality of symbols on the reels, said symbols including a plurality of designated symbols each at different designated positions on said reels, each of said designated symbols selectively displayable on the reels as first indicia or as different second indicia at the designated position of said designated symbol on the reels, at least two of the designated symbols being the same, the first indicia of said same designated symbols being the same and the second indicia of at least two of the designated symbols being different and each of said designated symbols having a function on the reels in the game for determining any winning outcomes;

means for causing a selection of the first indicia or the second indicia of one of the plurality of designated symbols to be displayed at the designated position of said designated symbol on said reels, wherein if the selection is of the first indicia or the second indicia of the said designated symbol to be displayed at the designated position of said designated symbol on said reels, the processor causes (a) the selected first indicia or the selected second indicia of said designated symbol to be displayed on the reels at said designated position on the reels, and (b) the corresponding first indicia or second indicia for at least one other designated symbol to be displayed on the reels at said designated position of said other designated symbol on the reels; and at least one winning outcome adapted to be provided to the player based on the symbols generated on said reels regardless of which of said indicia is displayed at the designated position of said designated symbol.

110. The gaming device of claim 109, wherein the selection causing means causes a random selection.

111. The gaming device of claim 109, wherein the functions of a plurality of the designated symbols are the same in the game for determining any winning outcomes based on the symbols generated on the reels.

112. A gaming device operable under control of a processor, said gaming device comprising:

a game controlled by the processor and operable upon a wager by a player;

a plurality of reels in the game;

a plurality of symbols on the reels, said symbols including a plurality of designated symbols each at different designated positions on said reels, each of said designated symbols selectively displayable on the reels as first indicia or as different second indicia at the designated position of said designated symbol on the reels, each of said designated symbols having a function on the reels in the game for determining any winning outcomes, and the functions of a plurality of the designated symbols are the same in the game for determining any winning outcomes based on the symbols generated on the reels;

means for causing a selection of the first indicia or the second indicia of one of the plurality of designated symbols to be displayed at the designated position of said designated symbol on said reels, wherein if the selection is of the first indicia or the second indicia of the said designated symbol to be displayed at the designated position of said designated symbol on said reels, the processor causes (a) the selected first indicia or the selected second indicia of said designated symbol to be displayed on the reels at said designated position on the reels, and (b) the corresponding first indicia or second indicia for at least one other designated symbol to be displayed on the reels at said designated position of said other designated symbol on the reels; and at least one winning outcome adapted to be provided to the player based on the symbols generated on said reels regardless of which of said indicia is displayed at the designated position of said designated symbol.

113. The gaming device of claim 112, wherein the selection causing means causes a random selection.

114. The gaming device of claim 112, wherein at least two of the designated symbols are the same symbol.

115. The gaming device of claim 112, wherein the first indicia of one of said same designated symbols is the same as the first indicia of another of said same designated symbols.

116. The gaming device of claim 112, wherein the first indicia of each of said same designated symbols are the same and the second indicia of each of said same designated symbols are the same.

117. The gaming device of claim 112, wherein the first indicia of at least two of same designated symbols are different.

118. The gaming device of claim 112, wherein at least two of the designated symbols are different symbols.

119. The gaming device of claim 112, wherein the first indicia of at least two of the designated symbols are different.

120. The gaming device of claim 112, wherein at least two of the designated symbols are the same symbol, the first indicia of the designated symbol are the same, and the second indicia of at least two of the designated symbols are different.

121. A gaming device operable under control of a processor, said gaming device comprising:

a game controlled by the processor and operable upon a wager by a player;

a plurality of reels in the game;

a plurality of symbols on the reels, said symbols including a plurality of designated symbols at different designated positions on said reels, each of said designated symbols selectively displayable on the reels as one of a plurality of different indicia at the designated position of said designated symbol on the reels, each of said designated symbols having a function on the reels in the game for determining any winning outcomes, and the function of at least two of the designated symbols being the same in the game for determining any winning outcomes based on the symbols generated in the reels;

means for causing a selection of one of the plurality of different indicia of one of the plurality of designated symbols to be displayed at the designated position of said designated symbol on said reels, wherein after the selection of one of the plurality of indicia of said designated symbol to be displayed at said designated position of said designated symbol on said reels, the processor causes (a) the selected indicia of said designated symbol to be displayed on the reels at said designated position on the reels, and (b) the corresponding indicia for at least one other designated symbol to be displayed on the reels at said designated position of said other designated symbol on the reels; and at least one winning outcome adapted to be provided to the player based on the symbols generated on said reels and regardless of which of said indicia is displayed at the designated position of said designated symbol.

122. The gaming device of claim 121, wherein the selection causing means causes a random selection.

123. The gaming device of claim 121, wherein at least two of the designated symbols are the same symbol.

124. The gaming device of claim 121, wherein all of the designated symbols are the same symbol.

125. The gaming device of claim 121, wherein the plurality of different indicia for each of the designated symbols are the same.

126. A gaming system comprising:

a gaming device including at least one display device and at least one input device; and a server remote from the gaming device and configured to communicate with said gaming device, said server and said gaming device configured to:

(i) after a player makes a first wager at a first time using said at least one input device, (a) cause a first random generation of a first plurality of symbols from a first set of symbols, said first set of symbols including a plurality of different symbols, (b) cause said display device to display said generated first plurality of symbols, and (c) cause any awards associated with any first winning symbol or symbol combinations of said generated first plurality of symbols to be provided to the player, (ii) after the player makes an input to change said symbols at a second subsequent time using said at least one input device:

(d) cause a change on the at least one display from the first set of symbols to a second set of symbols, said second set of symbols being different than the first set of symbols, said second set of symbols including a plurality of different symbols than said symbols in said first set of symbols, and wherein all of the second symbols in said second set of symbols are different than first symbols in said first set of symbols.

(iii) after the player makes a second wager using said at least one input device, (e) cause a second random generation of a second plurality of symbols from the second set of symbols which are not in the first set of symbols, (f) cause said display device to display said generated second plurality of symbols, and (g) cause any awards associated with any second winning symbols or second winning symbol combinations of said generated second plurality of symbols to be provided to the player, and such that the server at least in part causes (d).

127. The gaming system of claim 126, wherein the server and said gaming device are configured to: cause said plurality of generated first symbols and the plurality of generated second symbols to be displayed in the same positions by the display device.

128. The gaming system of claim 126, wherein first winning symbols and first winning symbol combinations and the second winning symbols and second winning symbol combinations are evaluated based on a same paytable.

129. The gaming system of claim 126, wherein first winning symbols and first winning symbol combinations and the second winning symbols and second winning symbol combinations are evaluated based on different paytables.

130. The gaming system of claim 126, wherein the server at least in part causes at least one of (a), (b), (e), and (f).

131. A gaming system comprising:

a gaming device including at least one display device and at least one input device; and a server remote from the gaming device and configured to communicate with said gaming device, said server and said gaming device configured to:

(i) after a player makes a first wager at a first time using said at least one input device, (a) cause a first random generation of a first plurality of symbols from a first set of symbols, said first set of symbols including a plurality of different symbols, (b) cause said display device to display said generated first plurality of symbols, and (c) cause any awards associated with any first winning symbol or symbol combinations of said generated first plurality of symbols to be provided to the player, (ii) after the player makes an input to change said symbols at a second subsequent time using said at least one input device:

(d) cause a change on the at least one display from the first set of symbols to a second set of symbols, said second set of symbols being different than the first set of symbols, said second set of symbols including a plurality of different symbols than said symbols in said first set of symbols, (iii) after the player makes a second wager using said at least one input device, (e) cause a second random generation of a second plurality of symbols from the second set of symbols which are not in the first set of symbols, (f) cause said display device to display said generated second plurality of symbols, and (g) cause any awards associated with any second winning symbols or second winning symbol combinations of said generated second plurality of symbols to be provided to the player, and such that the server at least in part causes (d), and (iv) cause said plurality of generated first symbols and the plurality of generated second symbols to be displayed in the same positions by the display device.

132. The gaming system of claim 131, wherein first winning symbols and first winning symbol combinations and the second winning symbols and second winning symbol combinations are evaluated based on a same paytable.

133. The gaming system of claim 131, wherein first winning symbols and first winning symbol combinations and the second winning symbols and second winning symbol combinations are evaluated based on different paytables.

134. A gaming system comprising:

a gaming device including at least one display device and at least one input device; and a server remote from the gaming device and configured to communicate with said gaming device, said server and said gaming device configured to:

(i) after a player makes a first wager at a first time using said at least one input device, (a) cause a first random generation of a first plurality of symbols from a first set of symbols, said first set of symbols including a plurality of different symbols, (b) cause said display device to display said generated first plurality of symbols, and (c) cause any awards associated with any first winning symbol or symbol combinations of said generated first plurality of symbols to be provided to the player, (ii) after the player makes an input to change said symbols at a second subsequent time using said at least one input device:

(d) cause a change on the at least one display from the first set of symbols to a second set of symbols, said second set of symbols being different than the first set of symbols, said second set of symbols including a plurality of different symbols than said symbols in said first set of symbols, (iii) after the player makes a second wager using said at least one input device, (e) cause a second random generation of a second plurality of symbols from the second set of symbols which are not in the first set of symbols, (f) cause said display device to display said generated second plurality of symbols, and (g) cause any awards associated with any second winning symbols or second winning symbol combinations of said generated second plurality of symbols to be provided to the player, wherein first winning symbols and first winning symbol combinations and the second winning symbols and second winning symbol combinations are evaluated based on a same paytable, and such that the server at least in part causes (d).

135. The gaming system of claim 134, wherein the server at least in part causes at least one of (a), (b), (e), and (f).

136. A gaming system comprising:

a gaming device including at least one display device and at least one input device; and a server remote from the gaming device and configured to communicate with said gaming device, said server and said gaming device configured to:

(i) after a layer makes a first wager at a first time using said at least one input device, (a) cause a first random generation of a first plurality of symbols from a first set of symbols, said first set of symbols including a plurality of different symbols, (b) cause said display device to display said generated first plurality of symbols, and (c) cause any awards associated with any first winning symbol or symbol combinations of said generated first plurality of symbols to be provided to the player, (ii) after the player makes an input to change said symbols at a second subsequent time using said at least one input device:

(d) cause a change on the at least one display from the first set of symbols to a second set of symbols, said second set of symbols being different than the first set of symbols, said second set of symbols including a plurality of different symbols than said symbols in said first set of symbols, (iii) after the player makes a second wager using said at least one input device, (e) cause a second random generation of a second plurality of symbols from the second set of symbols which are not in the first set of symbols, (f) cause said display device to display said generated second plurality of symbols, and (g) cause any awards associated with any second winning symbols or second winning symbol combinations of said generated second plurality of symbols to be provided to the player, wherein first winning symbols and first winning symbol combinations and the second winning symbols and second winning symbol combinations are evaluated based on different paytables, and such that the server at least in part causes (d).

137. The gaming system of claim 136, wherein the server at least in part causes at least one of (a), (b), (e), and (f).

138. A gaming system comprising:

a gaming device including at least one display device and at least one input device; and a server remote from the gaming device and configured to communicate with said gaming device, said server and said gaming device configured to:

(i) after a player makes a first wager at a first time using said at least one input device, (a) cause a first random generation of a first plurality of symbols from a first set of symbols, said first set of symbols including a plurality of different symbols, (b) cause said display device to display said generated first plurality of symbols, and (c) cause any awards associated with any first winning symbol or symbol combinations of said generated first plurality of symbols to be provided to the player, (ii) after the player makes an input to change said symbols at a second subsequent time using said at least one input device:

(d) cause a change on the at least one display from the first set of symbols to a second set of symbols, said second set of symbols being different than the first set of symbols, said second set of symbols including a plurality of different symbols than said symbols in said first set of symbols, (iii) after the player makes a second wager using said at least one input device, (e) cause a second random generation of a second plurality of symbols from the second set of symbols which are not in the first set of symbols, (f) cause said display device to display said generated second plurality of symbols, and (g) cause any awards associated with any second winning symbols or second winning symbol combinations of said generated second plurality of symbols to be provided to the player, and such that the server at least in part causes (d), the server and said gaming device being configured to cause said plurality of generated first symbols and the plurality of generated second symbols to be displayed in the same positions by the display device.

139. A gaming system comprising:

a gaming device including at least one display device and at least one input device; and a server remote from the gaming device and configured to communicate with said gaming device, said server and said gaming device configured to:

(i) after a player makes a first wager at a first time using said at least one input device, (a) cause a first random generation of a first plurality of symbols from a first set of symbols, said first set of symbols including a plurality of different symbols, (b) cause said display device to display said generated first plurality of symbols, and (c) cause any awards associated with any first winning symbol or symbol combinations of said generated first plurality of symbols to be provided to the player, (ii) after the player makes an input to change said symbols at a second subsequent time using said at least one input device:

(d) cause a change on the at least one display from the first set of symbols to a second set of symbols, said second set of symbols being different than the first set of symbols, said second set of symbols including a plurality of different symbols than said symbols in said first set of symbols, (iii) after the player makes a second wager using said at least one input device, (e) cause a second random generation of a second plurality of symbols from the second set of symbols which are not in the first set of symbols, (f) cause said display device to display said generated second plurality of symbols, and (g) cause any awards associated with any second winning symbols or second winning symbol combinations of said generated second plurality of symbols to be provided to the player, and such that the server at least in part causes (d), the first winning symbols and first winning symbol combinations and the second winning symbols and second winning symbol combinations being evaluated based on a same paytable.

140. A gaming system comprising:

a gaming device including at least one display device and at least one input device; and a server remote from the gaming device and configured to communicate with said gaming device, said server and said gaming device configured to:

(i) after a player makes a first wager at a first time using said at least one input device, (a) cause a first random generation of a first plurality of symbols from a first set of symbols, said first set of symbols including a plurality of different symbols, (b) cause said display device to display said generated first plurality of symbols, and (c) cause any awards associated with any first winning symbol or symbol combinations of said generated first plurality of symbols to be provided to the player, (ii) after the player makes an input to change said symbols at a second subsequent time using said at least one input device:

(d) cause a change on the at least one display from the first set of symbols to a second set of symbols, said second set of symbols being different than the first set of symbols, said second set of symbols including a plurality of different symbols than said symbols in said first set of symbols, (iii) after the player makes a second wager using said at least one input device, (e) cause a second random generation of a second plurality of symbols from the second set of symbols which are not in the first set of symbols, (f) cause said display device to display said generated second plurality of symbols, and (g) cause any awards associated with any second winning symbols or second winning symbol combinations of said generated second plurality of symbols to be provided to the player, and such that the server at least in part causes (d), the first winning symbols and first winning symbol combinations and the second winning symbols and second winning symbol combinations being evaluated based on different paytables.

* * * * *

UNITED STATES PATENT AND TRADEMARK OFFICE

CERTIFICATE OF CORRECTION

PATENT NO. : 7,526,736 B2
APPLICATION NO. : 10/826465
DATED : April 29, 2009
INVENTOR(S) : Joseph E. Kaminkow It is certified that error appears in the above-identified patent and that said Letters Patent is hereby corrected as shown below:

In Column 7, Lines 62-64, change “This provides the player with an entertaining aside from playing the game.” to --The provides the player with entertainment aside from playing the game.--.

In Column 8, Line 19, change “enables the player obtain payout” to --enables the player to obtain payout--.

In Claim 34, Column 16, Line 10, change “The gaming device of claim 29, wherein and the second indicia” to --The gaming device of claim 29, wherein the second indicia--.

In Claim 78, Column 22, Lines 61-62, change “the first indicia of at least two of same designated symbols” to --the first indicia of at least two of the same designated symbols--.

In Claim 81, Column 23, Line 50, change “a) the selected first indicia or the selected second indicia” to --(a) the selected first indicia or the selected second indicia--.

In Claim 136, Column 33, Line 31, change “(i) after a layer makes a first wager” to --(i) after a player makes a first wager--.

Signed and Sealed this

Twenty-fourth Day of November, 2009

David J. Kappos

*Director of the United States Patent and Trademark Office*